United States Patent
Tanimoto et al.

[11] Patent Number: 6,001,450
[45] Date of Patent: Dec. 14, 1999

[54] VACUUM THERMAL INSULATING MATERIAL AND THERMALLY INSULATING CASE USING THE SAME

[75] Inventors: Yasuaki Tanimoto, Nishinomiya; Noriyuki Miyaji, Itami, both of Japan

[73] Assignee: Matsushita Refrigeration Company, Osaka, Japan

[21] Appl. No.: 09/197,269

[22] Filed: Nov. 20, 1998

Related U.S. Application Data

[63] Continuation of application No. 08/737,033, Jan. 14, 1997, abandoned, which is a continuation of application No. PCT/JP96/00533, Mar. 6, 1996.

[30] Foreign Application Priority Data

| Mar. 7, 1995 | [JP] | Japan | 7-047024 |
| Apr. 4, 1995 | [JP] | Japan | 7-078743 |
| Sep. 29, 1995 | [JP] | Japan | 7-252723 |
| Sep. 29, 1995 | [JP] | Japan | 7-252724 |
| Jan. 8, 1996 | [JP] | Japan | 8-000540 |
| Jan. 8, 1996 | [JP] | Japan | 8-000541 |

[51] Int. Cl.$^6$ ........................................................ B32B 1/06
[52] U.S. Cl. ............................................................... 428/69
[58] Field of Search .................................. 428/69; 52/406.2

[56] References Cited

U.S. PATENT DOCUMENTS

| 3,655,564 | 4/1972 | Barrington | 252/62 |
| 3,904,539 | 9/1975 | Ruff | 252/62 |
| 4,379,857 | 4/1983 | Hansen et al. | 521/54 |
| 4,579,592 | 4/1986 | Loomis | 106/18.11 |
| 4,755,313 | 7/1988 | Wahl et al. | 252/62 |
| 4,844,960 | 7/1989 | Spriggs et al. | 428/34.5 |
| 4,873,423 | 10/1989 | Takahashi | 219/390 |

FOREIGN PATENT DOCUMENTS

| 0 170 934 A2 | 2/1986 | European Pat. Off. |
| 61-036595 | 2/1986 | Japan |
| 61-103089 | 5/1986 | Japan |
| 61-144492 | 7/1986 | Japan |
| 2-005958 B2 | 2/1990 | Japan |
| 2-043954 B2 | 10/1990 | Japan |
| 5-044889 | 2/1993 | Japan |
| 5-209700 | 8/1993 | Japan |

*Primary Examiner*—Alexander Thomas
*Attorney, Agent, or Firm*—Akin, Gump, Strauss, Hauer & Feld, L.L.P.

[57] ABSTRACT

A vacuum thermal insulating material of the present invention and a thermally insulating case using the vacuum thermal insulating material are used as thermal insulation in, for example, refrigerators and freezers. The vacuum thermal insulating material has a core material including two or more different powders and an adsorbent. The vacuum thermal insulating material of the present invention has excellent performance of thermal insulation and is light in weight and manufactured at a low cost. The thermally insulating case of the present invention enables the performance of thermal insulation to be practically maintained over a long time period.

26 Claims, 4 Drawing Sheets

Ratio of addition of silica powder
[% by weight]

VACUUM THERMAL INSULATING MATERIAL AND THERMALLY INSULATING CASE USING THE SAME

CROSS REFERENCE TO RELATED APPLICATION

This application is a continuation of application Ser. No. 08/737,033, filed Jan. 14, 1997, abandoned, entitled Vacuum Thermal Insulating Material and Thermally Insulating Case Using The Same which is a continuation of PCT/JP96/00533 filed Mar. 6, 1996, The entire disclosure of application Ser. No. 08/737,033 as filed is incorporated herein by reference.

TECHNICAL FIELD

The present invention relates to a vacuum thermal insulating material applicable as thermal insulation in, for example, refrigerators and freezers, and a thermally insulating case using the vacuum thermal insulating material.

BACKGROUND ART

Destruction of the ozone layer by chlorofluorocarbon 11 (hereafter is called CFC11), which has been used as a blowing agent of thermal insulating material applied to, for example, refrigerators and freezers, is a global issue from the viewpoint of preservation of the global environment.

Based on such background, researchers have been concentrated on the development of thermal insulating materials using novel blowing agents of substitute CFCs or non-CFCs that replace CFC11. A typical example of the substitute CFC blowing agent is hydrochlorofluorocarbon 141b (HCFC 141 b). A typical example of the non-CFC blowing agent is cyclopentane.

These novel blowing agents have higher gas thermal conductivities than that of CFC11, and thereby lower the performance of thermal insulation in refrigerators and the like.

Taking into account the future energy restriction, energy-saving in refrigerators and the like is an inevitable issue. Improvement in performance of thermal insulation is one of the possible solutions.

As discussed above, the conventional thermal insulating materials have conflicting issues, that is, the actual drop in performance of thermal insulation due to the use of substitute CFCs and the requirement for improvement in performance of thermal insulation to attain energy-saving of apparatuses using thermal insulating materials.

Vacuum thermal insulating materials have been proposed as potential means for solving such conflicting issues as disclosed in, for example, the gazettes of the Japanese unexamined patent application (TOKKAI) Nos. Sho-57-173689 and Sho-61-144492. These vacuum thermal insulating materials are prepared from inorganic powder. These vacuum thermal insulating materials were obtained by filling a film-like plastic vessel with silica powder and sealing the vessel under reduced pressure.

A major advantage of the conventional vacuum thermal insulating materials is that they can be manufactured at the degree of vacuum of 0.1 to 1 mmHg which can be readily performed in the industrial process. The conventional vacuum thermal insulating materials containing fine silica powder have improved performance of thermal insulation at the same degree of vacuum, compared with those without silica powder.

The principle of thermal insulation in the vacuum thermal insulating material is to remove a gas that transmits heat, for example, the air, from essential parts of a thin case to be thermally insulated, such as doors and walls. It is, however, difficult to produce a high vacuum in the industrial (mass production) level. The practical degree of vacuum ranges from 0.1 to 10 mmHg. The vacuum thermal insulating materials accordingly have to obtain the desired performance of thermal insulation at the degree of vacuum of this range.

In the process of heat conduction via the air, the physical property affecting the performance of thermal insulation is the mean free path of gas molecules.

The mean free path represents a distance by which one molecule consisting of a gas, for example, the air, travels before colliding with another molecule. When voids formed in the air are greater than the mean free path, molecules collide with each other in the voids to produce heat conduction via the air. Such vacuum thermal insulating material has an increased thermal conductivity. When the voids are smaller than the mean free path, on the contrary, the vacuum thermal insulating material has a small thermal conductivity. This is because there is substantially no heat conduction due to the collision of gas molecules, for example, the air molecules.

In order to enhance the performance of thermal insulation in the vacuum thermal insulating material, it is required to form voids that are smaller than the mean free path of molecules. Filling fine powder having small particle diameters, such as silica powder, makes small voids and substantially eliminates the heat conduction due to the collision of the air molecules. As a result, the performance of thermal insulation is improved in the vacuum thermal insulating material.

The conventional structure using a large mass of silica powder, however, undesirably increases the weight of the vacuum thermal insulating material and raises the manufacturing cost.

DISCLOSURE OF INVENTION

The present invention is directed to a vacuum thermal insulating material which is light in weight and manufactured at a low cost and has excellent performance of thermal insulation, as well as a thermally insulating case using the vacuum thermal insulating material. The vacuum thermal insulating material of the present invention comprises a core material mainly composed of two or more different powders and an adsorbent. In the present invention, vacuum means the degree of vacuum of not higher than 10 mmHg.

The vacuum thermal insulating material of the present invention comprises a core material mainly composed of two or more powders that have at least different specific surface areas. The specific surface area here means a surface area per unit mass of powder.

In accordance with the present invention, the vacuum thermal insulating material comprises a core material mainly composed of a powder of organic material and a powder of inorganic material.

More specifically, the vacuum thermal insulating material of the present invention substantially comprises a powder of inorganic material having the specific surface area of greater than 20 $m^2/g$ and a powder of organic material having the specific surface area of not greater than 20 $m^2/g$.

In the vacuum thermal insulating material of the present invention, a fill of the powder of inorganic material in the core material is 2 percent or more by weight and 50 percent or less by weight.

In accordance with the present invention, the vacuum thermal insulating material comprises a powder of inorganic material having a needle-like crystal form as a surface modifier for a powder of organic material.

In the vacuum thermal insulating material of the present invention, the inorganic material functioning as a surface modifier is powder of calcium silicate in practice.

In the vacuum thermal insulating material of the present invention, the molar ratio of $SiO_2/CaO$ in the powder of calcium silicate functioning as a surface modifier is 2 or more but 3 or less.

In the vacuum thermal insulating material of the present invention, it is preferable that the powder of calcium silicate functioning as a surface modifier is treated to be hydrophobic.

In the vacuum thermal insulating material of the present invention, it is further preferable that the powder of surface-modified organic material is treated to be hydrophobic.

In the vacuum thermal insulating material of the present invention, the powder of surface-modified organic material is mixed with a fibrous material.

In accordance with the present invention, the vacuum thermal insulating material comprises a powder containing at least a salt of fatty acid as a surface modifier.

In the vacuum thermal insulating material of the present invention, the powder of organic material comprises a foamed plastic powder obtained by grinding.

In the vacuum thermal insulating material of the present invention, the powder of organic material has a needle-like crystal form.

In accordance with the present invention, the vacuum thermal insulating material comprises a powder of inorganic material as an adsorbent, the powder having pores 5% to 20% greater than the molecular diameter of an adsorbed material.

The vacuum thermal insulating material of the present invention preferably comprises at least a powder having a reflectance of 0.9 or more as one of the inorganic material.

The vacuum thermal insulating material of the present invention comprises a wet silica powder as one of the inorganic material.

In the vacuum thermal insulating material of the present invention, the core material has a gas phase volume ratio of 60% or more.

In accordance with the present invention, the vacuum thermal insulating material comprises a powder of organic material, the mean particle diameter of the powder being substantially equal to or less than 150 μm.

In accordance with the present invention, the vacuum thermal insulating material comprises a powder of organic material, the bulk density of the powder being substantially equal to or less than 150 kg/m³.

In the vacuum thermal insulating material of the present invention, the mean pore diameter of the core material comprising a powder of organic material and a powder of inorganic material is substantially equal to or less than 100 μm.

The present invention is also directed to a thermally insulating case, which comprises an outer casing, an inner casing, a thermal insulating foamed material packed in a space defined by the outer casing and the inner casing, and a vacuum thermal insulating material which is provided in an inner wall of the outer casing or an outer wall of the inner casing and comprises a core material mainly composed of two or more different powders and an adsorbent.

The thermally insulating case of the present invention can maintain high performance of thermal insulation over a long time period. Therefore, the present invention solves the problems of an excessive operating efficiency of a compressor and deteriorated quality of food in a refrigerator due to the deteriorated performance of thermal insulation.

In the thermally insulating case of the present invention, the core material is mainly composed of a powder of organic material and a powder of inorganic material.

In the thermally insulating case of the present invention, the powder of inorganic material has a specific surface area of 20 m²/g or less.

In accordance with the present invention, the thermally insulating case of the present invention comprises a powder of inorganic material having a needle-like crystal form as a surface modifier for a powder of organic material.

In accordance with the present invention, the thermally insulating case of the present invention comprises a powder containing at least a salt of fatty acid as a surface modifier for a powder of organic material.

In the thermally insulating case of the present invention, the powder of organic material has a needle-like crystal form.

In the thermally insulating case of the present invention, the core material has a gas phase volume ratio of 60% or more.

BEST MODE FOR CARRYING OUT THE INVENTION

Embodiment 1

Figure 1:
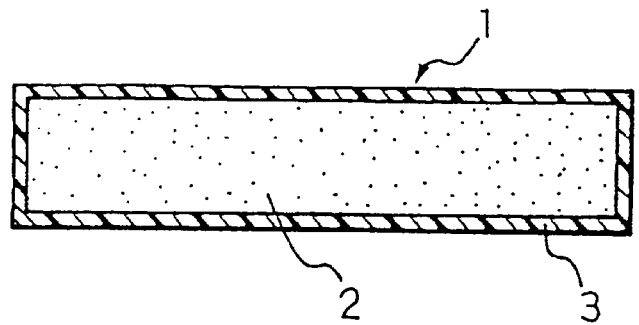
FIG. 1 is a cross sectional view illustrating a vacuum thermal insulating material in Embodiment 1 of the present invention.
Figure 2:
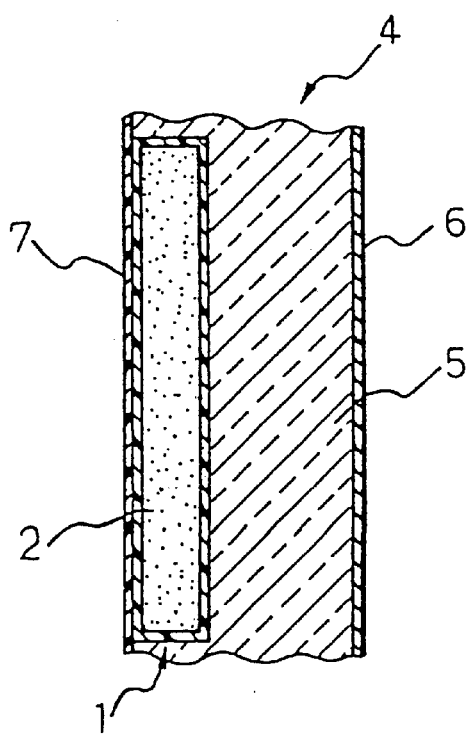
FIG. 2 is a cross sectional view illustrating a thermally insulating case in Embodiment 1 of the present invention.

The following describes Embodiment 1 of the present invention with the accompanying drawings of FIGS. 1 and 2. FIG. 1 is a cross sectional view illustrating a vacuum thermal insulating material 1 in Embodiment 1 of the present invention; and FIG. 2 is a cross sectional view illustrating a thermally insulating case using the vacuum thermal insulating material of FIG. 1.

Referring to FIG. 1, the vacuum thermal insulating material 1 includes a powdery mixture obtained by stirring a ground powder of urethane foam having the mean particle diameter of 150 μm and a synthetic silica powder with an agitating mill at a high speed (3600 rpm). The ground powder of urethane form is prepared by pressing urethane foam against an abrasive cloth having a grit of 150 μm.

The powdery mixture thus prepared is packed into a non-woven fabric having gas permeability to form a core material 2. The core material 2 is disposed in an outer member 3 composed of a metal-plastic film laminate. The vacuum thermal insulating material 1 is formed by evacuating an internal space surrounded by the outer member 3 with a vacuum pump to reduce the inner pressure to 0.1 mmHg and sealing the internal space under the reduced pressure.

Figure 3:
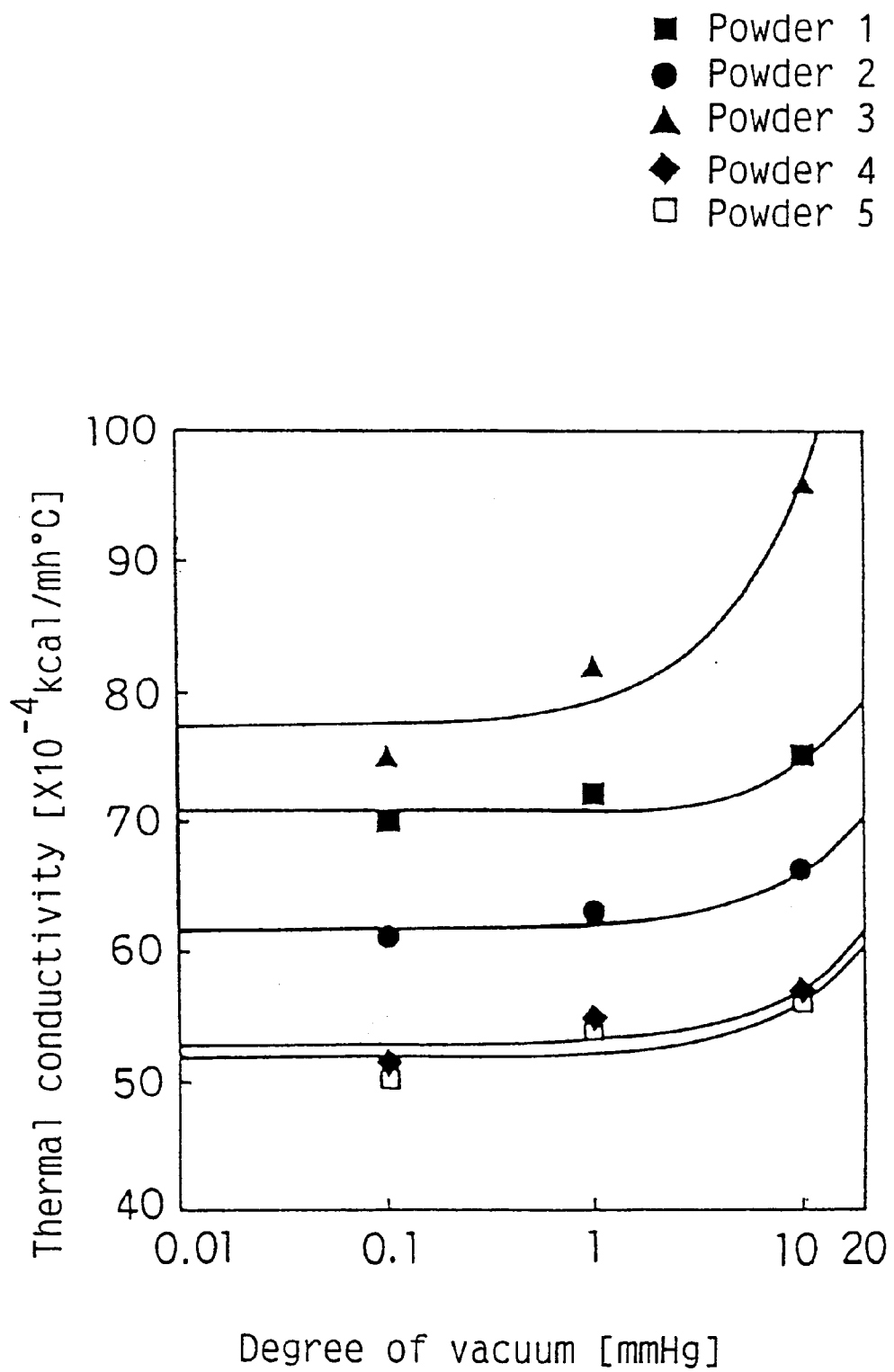
FIG. 3 is a characteristic chart showing the relationship between the degree of vacuum and the thermal conductivity in Embodiment 1 of the present invention.

Table 1 shows the specific surface area ($m^2/g$), the ratio of addition (percent by weight), the density ($kg/m^3$), and the thermal conductivity ($kcal/mh°C$) under the pressure of 0.1 mmHg of powders packed in the outer member 3. FIG. 3 is a characteristic chart showing the relationship between the degree of vacuum and the thermal conductivity with respect to the powders shown in Table 1.

TABLE 1

| Powders | Powder construction | Specific surface area [$m^2/g$] | Addition ratio [wt %] | Thermal conductivity under 0.1 mmHg [kcal/mh° C.] | Density [$kg/m^3$] |
|---|---|---|---|---|---|
| Powder 1 | Silica powder | 35.2 | 100 | 0.0070 | 180 |
| Powder 2 | Silica powder (1) | 35.2 | 75 | 0.0061 | 180 |
|  | Silica powder (2) | 62.1 | 25 |  |  |
| Powder 3 | Urethane Powder | 7.2 | 100 | 0.0075 | 102 |
| Powder 4 | Urethane powder (1) | 7.2 | 85 | 0.0051 | 135 |
|  | Silica powder (2) | 62.1 | 15 |  |  |
| Powder 5 | Urethane powder (2) | 2.1 | 92 | 0.0050 | 112 |
|  | Silica powder (2) | 62.1 | 8 |  |  |

Referring to the data regarding the silica powder that is a powder of inorganic material in Table 1 and FIG. 3, it is understood that the powdery mixture (Powder 2) of two silica powders having very different specific surface areas (silica powder (1) having the specific surface area of 35.2 $m^2/g$ and silica powder (2) having the specific surface area of 62.1 $m^2/g$) has improved performance of thermal insulation, though having the same density as that of the silica powder alone (Powder 1). This is because the silica powder having the large specific surface area fills in large voids, and clearly proves the effect of blending powders having different specific surface areas with each other.

Table 1 also shows the data regarding Powder 4 prepared by blending the urethane powder (1) having the specific surface area of 7.2 $m^2/g$ with the silica powder (2) having the specific surface area of 62.1 $m^2/g$. This proves that addition of the silica powder having the large specific surface area to the urethane powder remarkably improves the performance of thermal insulation. The urethane powder alone (Powder 3) has large voids and is thus significantly affected by the gas heat conduction due to collision of the air molecules, so that the resulting vacuum thermal insulating material has poor performance of thermal insulation.

The experimental studies of the inventors have proved that adding a small amount of silica powder improves the performance of thermal insulation. This enables application of ground urethane foam, that has conventionally been thought impossible. Application of urethane foam obtained as a waste to the vacuum thermal insulating material 1 of Embodiment 1 results in a remarkable cost reduction.

Application of a ground powder of urethane foam to the vacuum thermal insulating material 1 of Embodiment 1 significantly reduces the density of the powdery thermal insulating material. When an inorganic powder, such as silica, having the large specific surface area is used alone, the high packing ratio of the silica powder undesirably increases the weight of the resulting thermal insulating material. In case that silica powder is added to the ground powder of urethane foam, on the other hand, only a small number of parts of silica powder are required. This lowers the packing ratio of the silica powder and decreases the weight of the resulting thermal insulating material. This is supported by the comparison between Powder 4 and Powder 5 (powdery mixture of urethane powder (2) having the specific surface area of 2.1 $m^2/g$ and silica powder (2) having the specific surface area of 62.1 $m^2/g$) in Table 1. The ratio of addition of silica powder decreases with a decrease in specific surface area of urethane powder. Application of Powder 5, that is, the powdery mixture of urethane foam powder and silica powder, remarkably reduces the weight of the resulting vacuum thermal insulating material 1 of Embodiment 1.

As discussed above, application of the powdery mixture of urethane powder and silica powder gives the vacuum thermal insulating material 1 that has an excellent performance of thermal insulation and is light in weight and manufactured at a low cost. The powder of inorganic material applicable here is not limited to the synthetic silica. Perlite, diatomaceous earth, alumina, and titanium oxide may be used as the inorganic material and have the same effects as those of the powdery mixture described above.

The following describes a thermally insulating case 4 using the vacuum thermal insulating material 1 of FIG. 1. The thermally insulating case 4 is, for example, a thin casing, such as a door of a refrigerator.

As shown in FIG. 2, the thermally insulating case 4 includes the vacuum thermal insulating material 1 discussed above, a thermal insulating foamed material 5 composed of hard urethane foam, an outer casing 6 of a refrigerator (that is, a member forming an outer face of the refrigerator), and an inner casing 7 of the refrigerator (that is, a member forming an inner face of the refrigerator). Although the vacuum thermal insulating material 1 shown in FIG. 2 is attached to a large area of the inside the inner casing 7, it may be attached to the inside of the outer casing 6. The hard urethane foam used here is cyclopentane foamed polyurethane foam. The inner casing 7 is composed of an ABS resin, whereas the outer casing 6 is made of a steel plate. The dimensions of the vacuum thermal insulating material 1 used in Embodiment 1 are 1.0 m×0.5 m×0.02 m.

The thermally insulating case 4 including the vacuum thermal insulating material 1 exerts the excellent performance of thermal insulation. A long-term use of the refrigerator having the thermally insulating case 4 of Embodiment 1 accordingly does not lead to an excessive operating efficiency of the compressor due to an abrupt deterioration of the performance of thermal insulation. This solves the problem of deterioration of the quality of the refrigerator after a long-term use.

As mentioned above, the vacuum thermal insulating material 1 of Embodiment 1 is prepared by packing two or more powders having at least different specific surface areas into the outer member 3. Large voids formed by the powder having the small specific surface area are filled with the powder having the large specific surface area and thus reduced in size. This structure remarkably decreases the gas heat conduction by collision of the air molecules and improves the performance of thermal insulation in the vacuum thermal insulating material.

The vacuum thermal insulating material of this embodiment includes a powdery mixture of organic material and inorganic material. This structure decreases the ratio of addition of the inorganic material and heightens the ratio of the organic material having the smaller specific gravity than that of the inorganic material, so that the resulting vacuum thermal insulating material becomes light in weight.

In the vacuum thermal insulating material of this embodiment, ground plastic foam obtained as a waste is used for the powder of organic material. This remarkably reduces the manufacturing cost.

The thermally insulating case of the embodiment is prepared by laying the thermal insulating foamed material and the vacuum thermal insulating material one upon the other in the space defined by the thermally insulating case. This structure enables the vacuum thermal insulating material to maintain the performance of thermal insulation over a long time period.

Embodiment 2

The following describes a vacuum thermal insulating material 1 and a thermally insulating case 4 using the vacuum thermal insulating material 1 as Embodiment 2 of the present invention. The structures of the vacuum thermal insulating material 1 and the thermally insulating case 4 of Embodiment 2 are identical with those of Embodiment 1 shown in and described with FIGS. 1 and 2 and are thus not described here specifically.

The vacuum thermal insulating material 1 of Embodiment 2 is prepared by packing a powdery mixture of ground urethane foam and synthetic silica powder into an outer member 3 composed of a metal-plastic film laminate and sealing the outer member 3 under reduced pressure.

TABLE 2

| Urethane specific surface area [m²/g] | 5 | 10 | 15 | 20 | 22 | 25 | 27 | 29 | 31 | 33 | 35 | 37 |
|---|---|---|---|---|---|---|---|---|---|---|---|---|
| Dust explosion | − | − | − | − | + | + | + | + | + | + | + | + |

+: Exploded
−: Not exploded
Conditions: to fill 100 g and dry at 140° C. for one hour

TABLE 3

| Urethane specific surface area [m²/g] | 20 | 20 | 20 | 20 | 20 |
|---|---|---|---|---|---|
| Silica specific surface area [m²/g] | 5 | 10 | 15 | 20 | 25 |
| Thermal conductivity [kcal/mh°C.] | 0.0060 | 0.0060 | 0.0060 | 0.0060 | 0.0060 |
| Density [kg/m³] | 185 | 182 | 175 | 122 | 115 |

Table 2 shows the relationship between the specific surface area of the ground powder of urethane foam and the explosion of dust. In the experiment of dust explosion, the vacuum thermal insulating material 1 filled with 100 g of the ground powder of urethane foam is dried at the temperature of 140° C. for one hour. Table 3 shows the relationship between the specific surface area and the density in the ground powder of urethane foam and the synthetic silica powder mixed with each other. Referring to Table 3, the ground powder of urethane foam and the synthetic silica powder are mixed with each other to make the thermal conductivity to a fixed value (0.0060 kcal/mh°C.).

Table 2 shows that the specific surface area of the ground powder of urethane foam, that is an organic powder, is correlated to the explosion of dust. The fact experimentally obtained shows that the explosion of dust occurs when the specific surface area exceeds 20 m²/g. It is thought that an increase in specific surface area enhances the activity of the organic powder and the resulting excessive oxidation reaction with the air causes an increase in quantity of heat produced by the oxidation, which leads to an explosion.

According to the experimental data given above, the inventors have restricted the specific surface area of the organic powder to be equal to or less than 20 m²/g in Embodiment 2. This solves the problem of dust explosion attributable to the excessive oxidation reaction. This enables a waste, such as ground urethane foam, to be utilized as the thermal insulation in the vacuum thermal insulating material 1 of Embodiment 2, thereby remarkably reducing the cost and saving the resource.

Table 3 shows that the specific surface area of the inorganic powder mixed with the organic powder should be restricted, in order to reduce the weight of the vacuum thermal insulating material 1. In case that the specific surface area of the inorganic powder is smaller than that of the organic powder, a large amount of the inorganic powder is required to fill in the space formed by the organic powder. This results in an undesirable increase in weight to realize the equivalent thermal conductivity when the specific surface area of the inorganic powder is smaller than that of the organic powder.

In the vacuum thermal insulating material 1 of Embodiment 2, the specific surface area of the inorganic powder is restricted to be equal to or greater than 20 m²/g, which is greater than the specific surface area of the organic powder. This solves the problem of increased weight, which the conventional vacuum thermal insulating material of powder mixture has, and effectively reduces the weight of the vacuum thermal insulating material of Embodiment 2.

Figure 4:
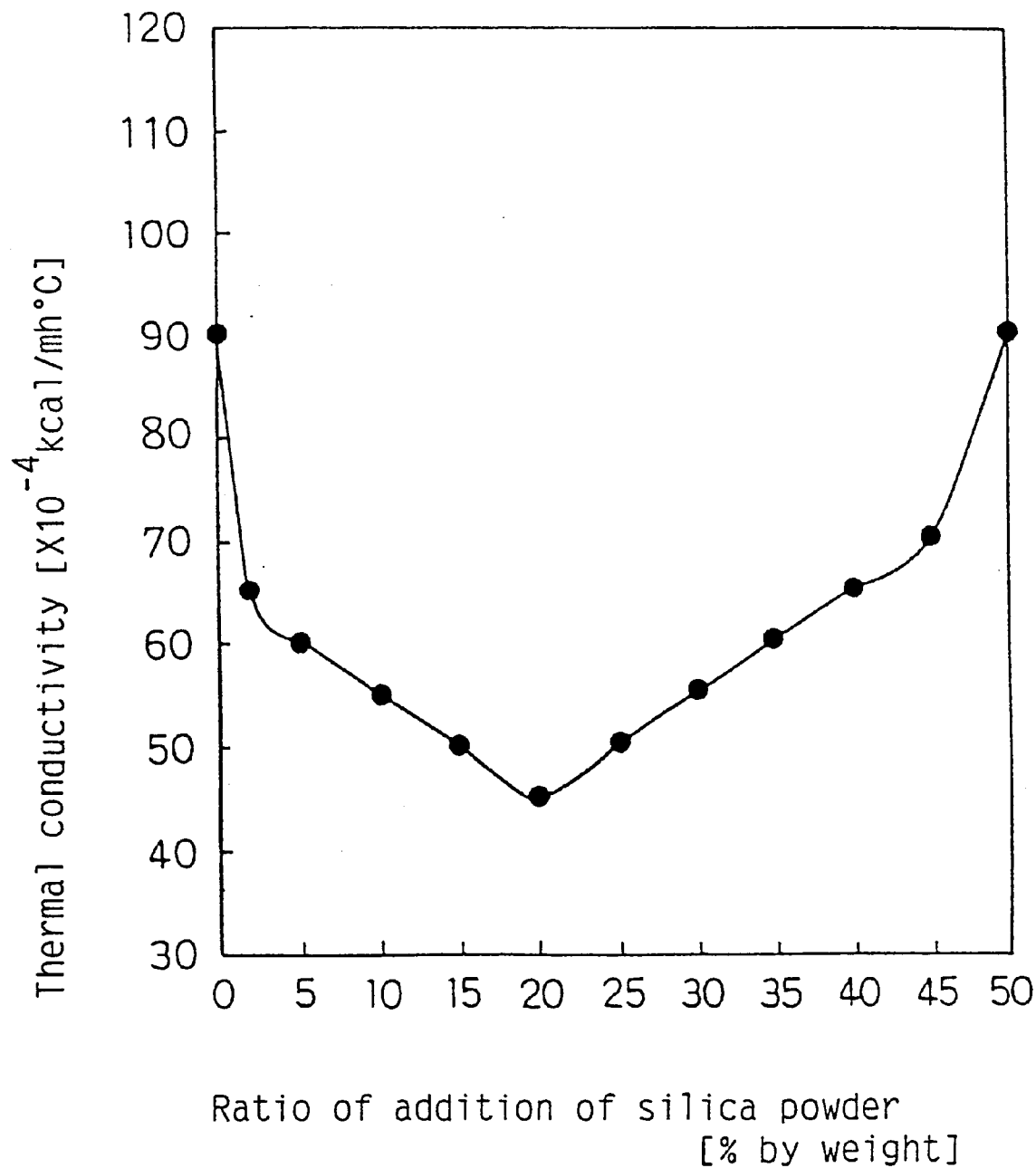
FIG. 4 is a characteristic chart showing the relationship between the ratio of addition of silica powder and the thermal conductivity in Embodiment 2 of the present invention.

FIG. 4 shows the relationship between the ratio of addition of silica powder and the thermal conductivity when the powdery mixture fulfilling the above conditions includes the ground powder of urethane foam having the specific surface area of 20 m²/g and the silica powder having the specific surface area of 50 m²/g.

As clearly understood from FIG. 4, addition of silica powder to the ground powder of urethane foam up to 20 percent by weight decreases the thermal conductivity of the vacuum thermal insulating material 1 while improving the performance of thermal insulation. A further addition of silica powder worsens the performance of thermal insulation of the vacuum thermal insulating material 1. When the amount of addition of silica powder exceeds 50 percent by weight, the performance of thermal insulation becomes worse than that of the ground powder of urethane foam alone.

The change in performance of thermal insulation with a variation in thermal conductivity may be ascribed to the following.

While the silica powder is added up to 20 percent by weight, the distance of the space formed by the ground powder of urethane foam becomes shortened. This reduces the thermal conductivity due to the collision of gas molecules and thereby improves the performance of thermal insulation. Addition exceeding 20 percent by weight, on the other hand, makes the silica powder excess and increases the contact area of powder, thereby worsening the performance of thermal insulation. The reason is assumed as above.

In the vacuum thermal insulating material 1 of Embodiment 2, the ratio of addition of silica powder is restricted to be not less than 2 percent by weight but not greater than 50 percent by weight. Compared with the ground powder of urethane foam alone, this restricted range exerts the effects of reducing the thermal conductivity by the addition of silica powder and thereby improving the performance of thermal insulation. The resulting vacuum thermal insulating material 1 of Embodiment 2 accordingly has excellent performance of thermal insulation and low dependence upon the pressure.

The following describes the thermally insulating case 4 in Embodiment 2. The structure of the thermally insulating case 4 of Embodiment 2 is identical with that of the thermal insulating case 4 of Embodiment 1, which has already been described with the drawing of FIG. 2. The thermally insulating case 4 of Embodiment 2 includes the vacuum thermal insulating material 1, a thermal insulating foamed material 5 composed of hard urethane foam, an outer casing 6, and an inner casing 7. In the thermally insulating case 4, the vacuum thermal insulating material 1 is attached to the inner wall of either the inner casing 7 or the outer casing 6. The dimensions of the vacuum thermal insulating material 1 of Embodiment 2 are 1.0 m×0.5 m×0.02 m.

The thermally insulating case 4 thus constructed includes the vacuum thermal insulating material 1 having excellent performance of thermal insulation and very low dependence upon the pressure. A long-term use accordingly does not lead an excessive operating efficiency of the compressor due to an abrupt deterioration of the performance of thermal insulation. This solves the problem of deterioration of the quality of food in the refrigerator.

As discussed above, in the vacuum thermal insulating material 1 of Embodiment 2, the specific surface area of the organic powder is restricted to be equal to or less than 20 $m^2/g$. This structure solves the problem of dust explosion due to the enhanced activity of the organic powder. This enables a waste, such as ground urethane foam, to be applied for the vacuum thermal insulating material 1 of Embodiment 2, thereby remarkably reducing the manufacturing cost.

The vacuum thermal insulating material 1 of Embodiment 2 includes the inorganic powder having the specific surface area of not less than 20 $m^2/g$. This makes the specific surface area of the inorganic powder equal to or greater than that of the organic powder, thereby reducing the weight.

In the vacuum thermal insulating material 1 of Embodiment 2, the fill of the inorganic powder is restricted to be not less than 2 percent by weight but not greater than 50 percent by weight. This exerts the effect of reducing the thermal conductivity by addition of silica powder. The resulting vacuum thermal insulating material 1 of Embodiment 2 has excellent performance of thermal insulation and low dependence upon the pressure.

The thermally insulating case 4 of Embodiment 2 is prepared by laying the thermal insulating foamed material 5 and the vacuum thermal insulating material 1 one upon the other in the space defined by the thermally insulating case 4. This structure enables the thermally insulating case 4 of Embodiment 2 to maintain the performance of thermal insulation over a long time period.

Embodiment 3

The following describes a vacuum thermal insulating material 1 and a thermally insulating case 4 using the vacuum thermal insulating material 1 as Embodiment 3 of the present invention. The structures of the vacuum thermal insulating material 1 and the thermally insulating case 4 of Embodiment 3 are identical with those of Embodiment 1 shown in and described with FIGS. 1 and 2 and are thus not described here specifically. In Embodiment 3, seven examples are discussed as below.

Example 1

The following describes a vacuum thermal insulating material 1 of Example 1.

In the vacuum thermal insulating material 1 of Example 1, ground powder of urethane foam (mean particle diameter=100 $\mu$m) and calcium silicate powder (mean particle diameter=10 $\mu$m) having the needle-like crystal structure were mixed with each other at a high speed (3600 rpm) with an agitation mill. A core material 2 was then prepared by packing the fine powdery mixture thus obtained into a non-woven fabric having the gas permeability. The core material 2 was disposed in an outer member 3 composed of a metal-plastic film laminate. The vacuum thermal insulating material 1 of Embodiment 3 was prepared by reducing the internal pressure of the outer member 3 to 0.1 mmHg with a vacuum pump and then sealing the outer member 3.

In the vacuum thermal insulating material 1 of Example 1, the needle-like powder aggregated on the surface of the organic powder gives a bulking power, which prevents the closest packing of the organic powder and increases the ratio of gas phase. In this embodiment, the bulking power of the powder means that the particles have a large number of protrusions on their surface and that the protrusions form or occupy a relatively large fraction of a space so as to maintain a small bulk density, when the particles alone or a mixture with another type of particles are packed into the space.

As discussed above, the vacuum thermal insulating material 1 of Example 1 includes the powder having a large bulking power to increase the ratio of gas phase. This reduces the gas heat conduction due to the solid contact in the powdery mixture and thereby improves the performance of thermal insulation. The vacuum thermal insulating material 1 of Example 1 includes the organic powder having a small specific gravity as a primary component, thereby effectively reducing the weight.

TABLE 4

Thermal Conductivity of Vacuum Thermal Insulating Material [kcal/mh ° C.]

| Amount of Inorganic Powder Added [wt %] | Example 1 Calcium Silicate | Comparison 1 Inorganic Powders Talc | Comparison 2 Calcium Carbonate |
| --- | --- | --- | --- |
| 0.5 | 0.0048 | 0.0055 | 0.0055 |
| 1.0 | 0.0045 | 0.0052 | 0.0055 |
| 2.0 | 0.0047 | 0.0050 | 0.0050 |
| 5.0 | 0.0050 | 0.0048 | 0.0049 |
| 10.0 | 0.0052 | 0.0051 | 0.0051 |

Table 4 shows the thermal conductivity of the vacuum thermal insulating material 1 which has the core material 2 including the organic powder whose surface has been modified by the specified amount of inorganic powder added. Referring to Table 4, Example 1 shows the optimum amount of addition, in case that calcium silicate is used as the inorganic powder. Comparisons 1 and 2 respectively use talc powder (mean particle diameter=3 μm) expressed as $4SiO_2 \cdot 3MgO \cdot H_2O$ and calcium carbonate powder (mean particle diameter=10 μm) expressed as $CaCO_3$, in place of calcium silicate, as a surface modifier. As shown in Table 4, the optimum amount of addition was 1.0% by weight in Example 1 and 5% by weight in Comparisons 1 and 2.

TABLE 5

| | Example 1 | Comparison 1 Inorganic powders | Comparison 2 |
| --- | --- | --- | --- |
| | Calcium Silicate | Talc | Calcium Carbonate |
| Form | Needle-like | Plate-like | Ball-like |
| Optimum Amount of Addition [wt %] | 1.0 | 5.0 | 5.0 |
| Bulk Density [kg/m$^3$] | 90 | 112 | 119 |
| Thermal Conductivity [kcal/mh ° C.] | 0.0045 | 0.0048 | 0.0049 |

Table 5 shows the crystal structure of the inorganic powder used, the bulk density of the surface modifier at the optimum amount of addition, and the thermal conductivity corresponding to the performance of thermal insulation of the surface-modified powder. Like Table 4, Comparisons 1 and 2 in Table 5 respectively use talc powder (mean particle diameter=3 μm) expressed as $4SiO_2 \cdot 3MgO \cdot H_2O$ and calcium carbonate powder (mean particle diameter=10 μm) expressed as $CaCO_3$.

The measurement of the thermal conductivity representing the performance of thermal insulation of the vacuum thermal insulating material was carried out at the average temperature of 24° C. with Auto-A(HC-072) manufactured by Eiko Seiki Co., Ltd., Tokyo.

Referring to Table 5, it is shown that the needle-like inorganic powder used as a surface modifier shows the most excellent performance of thermal insulation at the optimum amount of addition. The bulk density increases in the order of needle-like form, plate-like form, and ball-like form of the inorganic powder used as a surface modifier.

The difference in performance of thermal insulation is attributable to the difference in bulking power of the surface modifier aggregated on the surface of the organic powder. The needle-like powder has the largest bulking power, which prevents the closest packing of the organic powder and increases the ratio of gas phase. This decreases the heat conduction due to the solid contact of the powdery mixture in the vacuum thermal insulating material 1 of Example 1. The difference in bulk density is also attributable to the difference in bulking power.

The vacuum thermal insulating material 1 of Example 1 includes the organic powder having a small specific gravity as a primary component, and is thereby light in weight. Application of the needle-like surface modifier to the vacuum thermal insulating material 1 effectively improves the performance of thermal insulation.

Example 2

The following describes a vacuum thermal insulating material 1 of Example 2.

The vacuum thermal insulating material 1 of Example 2 includes a core material filled with calcium silicate expressed as $CaSiO_3$. Calcium silicate has a number of silanol groups on its surface and accordingly possesses a strong polarity. Even a very small amount of calcium silicate can effectively work as a surface modifier and reduce the size of pores formed by the aggregates. Even when the waste of urethane foam is used as the organic powder, the vacuum thermal insulating material 1 of Example 2 has little effect of gas heat conduction due to the collision of gas molecules, and thereby possessing improved performance of thermal insulation. The vacuum thermal insulating material 1 of Example 2 enables the application of waste and uses calcium silicate, which is mass produced as various additives and industrially available at a low cost, thereby being manufactured at a remarkably low cost.

Referring to Table 4, it is understood that the performance of thermal insulation of the vacuum thermal insulating material 1 is varied by the amount of addition of the surface modifier and that the respective surface modifiers differ in optimum amount of addition. Especially calcium silicate used as a surface modifier shows the excellent performance of thermal insulation by a very small amount of 1.0% by weight.

Unlike the other surface modifiers, calcium silicate has a number of silanol groups on its surface as the characteristic crystal structure and accordingly possesses a strong polarity. Addition of even a very small amount of calcium silicate and high-speed agitation enable the calcium silicate to be dispersed on the surface of urethane foam and thereby reducing the size of pores formed by the aggregates. Even a small amount of calcium silicate added as a surface modifier can thus exert the similar effects to those of the other surface modifiers.

The vacuum thermal insulating material 1 of Example 2 utilizes the waste of urethane foam as the organic powder, as well as calcium silicate, which is industrially available at a low cost, thereby being manufactured at a remarkably low cost.

Example 3

The following describes a vacuum thermal insulating material 1 of Example 3.

Although calcium silicate expressed as $CaSiO_3$ and applied to the vacuum thermal insulating material 1 of Example 3 generally has the needle-like crystal structure, the crystal structure may be varied with the molar ratio of $SiO_2/CaO$. It is accordingly important to restrict the molar ratio of $SiO_2/CaO$, in order to ensure the needle-like crystal structure of calcium silicate. When the molar ratio is smaller than 2, calcium silicate shows the plate-like or needle-like structure. When the molar ratio is greater than 3, calcium silicate shows the petal-like or block-like crystal structure. When the molar ratio ranges from 2 to 3, on the other hand, calcium silicate shows the needle-like aggregate structure.

The powder having the needle-like aggregate structure adheres to the surface of organic powder by the surface modification, so as to increase the bulking power and effectively prevent the closest packing of the core material 2 composed of the powdery mixture. The powder having the needle-like aggregate structure prevents excessive contact of the particles and reduces the solid thermal conductivity. Such powder has excellent flexibility and does not form large pores. This structure effectively reduces the number of pores having the inter-void distance of equal to or greater than the mean free path of the air under the pressure of 0.1 to 10 mmHg, which is readily realized in the industrial level. The vacuum thermal insulating material of Example 3 includes calcium silicate having the molar ratio of $SiO_2/CaO$ ranging between 2 and 3. The calcium silicate used here has the needle-like aggregate structure and thereby improves the performance of thermal insulation in the vacuum thermal insulating material 1 of Example 3.

TABLE 6

|  | Example 3 | Comparison 1 | Comparison 2 |
| --- | --- | --- | --- |
| Molar Ratio of $SiO_2/CaO$ | 2.0 ~ 3.0 | 1.0 ~ 1.5 | 3.5 or more |
| Thermal Conductivity [kcal/mh ° C.] | 0.0045 | 0.0048 | 0.0047 |

Example 3 in Table 6 shows the thermal conductivity of the vacuum thermal insulating material 1 when 0.5% by weight of calcium silicate having the molar ratio of $SiO_2/CaO$ ranging between 2.0 and 3.0 is added to ground powder of urethane foam. Comparisons 1 and 2 show the thermal conductivities when calcium silicate having the molar ratio of $SiO_2/CaO$ ranging between 1.0 and 1.5 and calcium silicate having the molar ratio of not less than 3.5 are added respectively.

As shown in Table 6, the ground powder of urethane foam whose surface has been modified by calcium silicate having the molar ratio of $SiO_2/CaO$ ranging between 2.0 and 3.0 has the smallest thermal conductivity.

The vacuum thermal insulating material manufactured by adding calcium silicate to the ground powder of urethane foam was observed with a microscope. When the powder having the molar ratio ranging between 1.0 and 1.5 was added, the resulting vacuum thermal insulating material had the structure in which the plate-like and needle-like powders were closely packed. When the powder having the molar ratio of not smaller than 3.5 was added, the resulting vacuum thermal insulating material had the plate-like or block-like structure. When the powder having the molar ratio ranging between 2.0 and 3.0 was added, the resulting vacuum thermal insulating material had the plate-like or needle-like aggregate structure.

Adhesion of the plate-like or needle-like aggregate structure to the surface of the organic powder by the surface modification enhances the bulking power and effectively prevents the closest packing of the core material 2 composed of the powdery mixture. This structure prevents the excessive contact of particles and hardly increases the solid heat conduction in the powdery mixture due to the addition of the inorganic powder. The vacuum thermal insulating material 1 of Example 3 prepared by adding calcium silicate to the ground powder of urethane foam decreases the contact area of the organic particles and increases the contact thermal resistance. The vacuum thermal insulating material 1 has excellent flexibility and accordingly does not form large pores. This structure enables the vacuum thermal insulating material 1 of Example 3 to reduce the number of pores having the inter-void distance of equal to or greater than the mean free path of the air under the pressure of 0.1 mmHg, which is readily realized in the industrial level, and accordingly possess the excellent performance of thermal insulation.

Example 4

The following describes a vacuum thermal insulating material 1 of Example 4.

The inorganic powder such as calcium silicate has a very fine structure and thereby a very large specific surface area. Calcium silicate powder adsorbs the water content in the atmosphere, which is dissociated in the vacuum thermal insulating material 1 to increase the internal pressure, and thus worsens the performance of thermal insulation over the elapse of time.

In the vacuum thermal insulating material 1 of Example 4, the core material 2 is filled with the hydrophobic powder obtained by silylating the surface of calcium silicate expressed as $CaSiO_3$. In the vacuum thermal insulating material 1 of Example 4, the hydrophobic treatment of calcium silicate prevents the internal pressure from increasing due to the dissociation of the adsorbed water molecules, thereby effectively preventing the performance of thermal insulation of the vacuum thermal insulating material 1 from being worsened with time.

TABLE 7

| Time-based Variation in Thermal Conductivity [kcal/mh ° C.] of Organic Powder | | |
| --- | --- | --- |
| | Example 4 | Comparison |
| | Hydrophobic Treatment | |
| Days [day] | Yes | No |
| Initial Stage | 0.0045 | 0.0045 |
| 50 | 0.0045 | 0.0047 |
| 100 | 0.0046 | 0.0049 |
| 150 | 0.0048 | 0.0054 |

Example 4 in Table 7 shows the time-based variation thermal conductivity in the atmosphere of 50° C. when the surface of organic powder is modified by adding 0.5% by weight of the hydrophobic calcium silicate. Comparisons shows the time-based variation in thermal conductivity when no hydrophobic treatment has been carried out.

The silane coupling method using a silanol group-containing binder to bind the organic material with the inorganic material was applied for the hydrophobic treatment. In accordance with a concrete procedure, after calcium silicate was washed with diluted hydrochloric acid and stirred well in a solution obtained by dissolving vinyl ethoxysilane in a mixed solution of ethanol/water, silica powder was added to the calcium silicate.

As clearly seen in Table 7, compared with the case of adding hydrophobic calcium silicate, addition of non-hydrophobic calcium silicate caused the thermal conductivity to increase with the elapse of time and remarkably worsened the performance of thermal insulation.

This is attributable to the reasoning that the water molecules adsorbed on calcium silicate after the surface modification are dissociated with the elapse of time, so as to raise the internal pressure in the vacuum thermal insulating material 1 and increase the gas heat conduction.

The hydrophobic treatment carried out in the vacuum thermal insulating material 1 of Example 4 enables the water content to be readily removed by the heat treatment prior to the evacuating and sealing process, thereby preventing the time-based deterioration of the performance of thermal insulation.

Example 5

The following describes a vacuum thermal insulating material 1 of Example 5.

In the vacuum thermal insulating material 1 of Example 5, the core material 2 is filled with the hydrophobic powder obtained by silylating the surface of calcium silicate expressed as $CaSiO_3$ and the surface of ground powder of urethane foam. The hydrophobic treatment on the organic powder can reduce the water content occupying 90% of the gas evolved from the powder of urethane foam waste. The vacuum thermal insulating material 1 of Example 5 possesses a small coefficient of friction against the surface modifier and thereby has a remarkably improved fluidity after the modification. This leads to an improvement in orientation of the packing form of organic powder. This structure enables the vacuum thermal insulating material 1 of Example 5 to maintain the excellent performance of thermal insulation over a long time period.

TABLE 8

Time-based Variation in Thermal Conductivity [kcal/mh °C.] of Organic Powder

|  | Example 5 | Comparison |
|---|---|---|
|  | Hydrophobic Treatment | |
| Days [day] | ◉ | ○ |
| Initial Stage | 0.0045 | 0.0045 |
| 50 | 0.0045 | 0.0047 |
| 100 | 0.0046 | 0.0049 |
| 150 | 0.0048 | 0.0054 |

◉: Hydrophobic Treatment for both Inorganic Powder and Organic Powder
○: Hydrophobic Treatment for only Inorganic Example 5 in Table 8 shows the time-based variation in thermal conductivity in the atmosphere of 50° C. when the surface of hydrophobic organic powder is modified by adding 0.5% by weight of the hydrophobic calcium silicate. Comparison shows the time-based variation in thermal conductivity when hydrophobic treatment has been carried out only for calcium silicate.

The silane coupling method was applied for the hydrophobic treatment. In accordance with a concrete procedure, after calcium silicate was washed with diluted hydrochloric acid and stirred well in a solution obtained by dissolving vinyl ethoxysilane in a mixed solution of ethanol/water, silica powder was added to the calcium silicate.

As clearly shown in Table 8, in case that the hydrophobic treatment was carried out for both the inorganic powder and the organic powder, the thermal conductivity was hardly varied with the elapse of time.

This is attributable to the reasoning that the water content occupying 90% of the gas evolved from urethane powder with the elapse of time can be reduced by sufficiently washing and silane-coupling the non-reacted content of the organic powder which has not been separated in the grinding process.

As mentioned above, in the vacuum thermal insulating material 1 of Example 5, the hydrophobic treatment is carried out for both the inorganic powder and the organic powder, so that the water content occupying the greater part of the gas evolved from urethane foam powder can be effectively removed. The vacuum thermal insulating material 1 of Example 5 possesses a small coefficient of friction against the surface modifier and thereby has a remarkably improved fluidity after the modification. This leads to an improvement in orientation of the packing form of organic powder in the vacuum thermal insulating material 1 of Example 5. This structure enables the vacuum thermal insulating material 1 of Example 5 to maintain the excellent performance of thermal insulation over a long time period.

Example 6

The following describes a vacuum thermal insulating material 1 of Example 6.

In the vacuum thermal insulating material 1 of Example 6, a core material 2 is filled with particles obtained by mixing a ground powder of urethane foam with a fibrous material. A large number of fibrous elements are thus protruded from the surface of the ball-like particles, which enhances the effect of bulking power. The vacuum thermal insulating material 1 of Example 6 is thus significantly light in weight.

The particles included in the vacuum thermal insulating material 1 of Example 6 have a very small bulk density after the surface modification. This further reduces the weight of the resulting vacuum thermal insulating material 1.

TABLE 9

Relationship between Particle Diameter and Bulk Density of [kg/m³] Powdery Mixture

|  | Example 6 | Comparison |
|---|---|---|
|  | Shape of Particles Mixed | |
| Particle Diameter [μm] | Needle-like | Ball-like |
| 100 | 59 | 85 |
| 300 | 56 | 73 |
| 500 | 51 | 56 |

Table 9 shows the relationship between the particle diameter and the bulk density when the organic powder (urethane foam powder having the particle diameter of 10 μm) is mixed with a needle-like fibrous material (glass wool having the longitudinal diameter of 200 μm). Comparison shows the same when a ball-like powdery material is mixed.

Data of Table 9 show that the bulk density decreases with an increase in particle diameter irrespective of the shape of the particles mixed. This is because the smaller particles lead the closest packing.

It is generally difficult to regulate the shape of particles since the granulated particles are aggregated by utilizing the charge characteristics in an electrolytic solution of the powder. Mixing a needle-like fibrous material which is structurally most different from the shape of readily granulated particles (ball-like or pellet-like form) gives the bulking power to the granulated particles. The mixing granulation significantly affects the bulk density and lessens the density of the resulting granulated particles. This remarkably reduces the weight of the vacuum thermal insulating material of Example 6.

Example 7

The following describes a thermally insulating case 4 of Embodiment 3 as Example 7. The thermally insulating case 4 of Example 7 includes the vacuum thermal insulating material 1 specified as any one of Examples 1 to 6 discussed above, a thermal insulating foamed material 5 composed of hard urethane foam, an outer casing, and an inner casing 7 and is structured in the same manner as the thermally insulating case 4 of Embodiment 1 shown in FIG. 2. In the thermally insulating case 4, the vacuum thermal insulating material 1 is attached to the inner wall of either the inner casing 7 or the outer casing 6. The dimensions of the vacuum thermal insulating material 1 of Example 7 are 0.5 m×0.5 m×0.02 m.

The thermally insulating case 4 thus constructed has high reliability and excellent performance of thermal insulation. A long-term use of the thermally insulating case 4 thus does not significantly lower the performance of thermal insulation. The refrigerator or freezer using the thermally insulating case 4 of Example 7 does not cause the compressor to be excessively operated with an abrupt change of the outside temperature, thereby maintaining the reliability of the thermally insulating case 4.

Embodiment 4

The following describes a vacuum thermal insulating material 1 and a thermally insulating case 4 using the vacuum thermal insulating material 1 as Embodiment 4 of the present invention. The structures of the vacuum thermal insulating material 1 and the thermally insulating case 4 of Embodiment 4 are identical with those of Embodiment 1 shown in and described with FIGS. 1 and 2 and are thus not described here specifically. In Embodiment 4, five examples are mentioned as below.

Example 1

The following describes a vacuum thermal insulating material 1 of Example 1. The vacuum thermal insulating material 1 of Example 1 is prepared by arranging a core material 2, which is composed of ground powder of urethane foam (mean particle diameter=150 μm), aggregate silica powder (mean particle diameter=7 μm), and calcium stearate powder (mean particle diameter=0.1 μm), in an outer member 3, reducing the internal pressure to 0.1 mmHg, and sealing the outer member 3 under the reduced pressure. The outer member 3 is composed of aluminum foil film laminate. The aluminum foil film laminate includes polyethylene terephthalate (thickness=12 μm) as a surface protecting layer, an aluminum foil (6 μm), and a high-density polyethylene (60 μm) as a heat welding layer.

In accordance with a concrete procedure, the vacuum thermal insulating material of Example 1 was prepared in the following manner.

The core material 2 was prepared by mixing aggregate silica powder (mean particle diameter=5 μm), 1% by weight of calcium stearate powder (mean particle diameter=0.1 μm), and an organic powder (mean particle diameter=150 μm) at a high speed of 3600 rpm in an agitation mill. The core material 2 was then packed and sealed in a polypropylene non-woven fabric, which had been formed to a bag shape to make the dimensions of the resulting vacuum thermal insulating material 1 equal to 0.30 m×0.30 m×0.03 m. The core material 2 sealed in the non-woven fabric was further packed into the outer member 3 of aluminum foil film laminate and sealed therein under the reduced internal pressure of 0.1 mmHg or less.

In the vacuum thermal insulating material 1 of Example 1 thus manufactured, the calcium stearate powder that is a powder of a salt of fatty acid eliminates the molecular orientation on the surface of the organic powder. The silica powder is simultaneously aggregated on the surface of the organic powder. This effectively prevents the ends of organic powder having the irregular shape from being destroyed and closely packed, thereby increasing the ratio of gas phase. The vacuum thermal insulating material 1 of Example 1 accordingly has reduced heat conduction due to the solid contact of the powdery mixture and thus improved performance of thermal insulation. The vacuum thermal insulating material 1 of Example 1 includes the organic powder having a small specific gravity as a primary component, thereby being light in weight.

TABLE 10

Thermal Conductivity [kcal/mh ° C.] of Vacuum Thermal Insulating Material

| Amount of Inorganic Powder Added [wt %] | Example 1 | Comparison 1 | Comparison 2 | Comparison 3 | Comparison 4 |
|---|---|---|---|---|---|
| | Inorganic Powders | | | | |
| | Aggregate Silica /Calcium Stearate | Aggregate Silica | Aggregate Silica /Talc | Aggregate Silica /Calcium Carbonate | Aggregate Silica /Calcium Laurate |
| 1.0 | 0.0045 | 0.0046 | 0.0052 | 0.0049 | 0.0046 |
| 2.0 | 0.0043 | 0.0047 | 0.0046 | 0.0047 | 0.0044 |
| 5.0 | 0.0046 | 0.0050 | 0.0049 | 0.0050 | 0.0047 |
| 10.0 | 0.0050 | 0.0052 | 0.0051 | 0.0052 | 0.0050 |

TABLE 11

Bulk Density [kg/m$^3$] of Vacuum Thermal Insulating Material

| Amount of Inorganic Powder Added [wt %] | Example 1 | Comparison 1 | Comparison 2 |
|---|---|---|---|
| | Inorganic Powders | | |
| | Aggregate Silica/ Calcium Stearate | Aggregate Silica | Aggregate Silica 100% |
| 1.0 | 0.089 | 0.097 | 0.128 |
| 2.0 | 0.092 | 0.100 | |
| 5.0 | 0.100 | 0.106 | |
| 10.0 | 0.103 | 0.109 | |

Example 1 in Table 10 shows various amounts of aggregate silica powder added to the ground powder of urethane foam and the thermal conductivity representing the performance of thermal insulation of the vacuum thermal insulating material at the respective amounts of addition. Comparison 1 shows the case in which calcium stearate is not added as the second component of inorganic powder. Comparisons 2 and 3 respectively show the cases in which talc powder (mean particle diameter=3 μm) expressed as 4SiO$_2$·3MgO·H$_2$O and calcium carbonate powder (mean particle diameter=10 μm) expressed as CaCO$_3$ are added as the second component of inorganic powder.

Comparison 4 in Table 10 shows the relationship between the amount of addition of aggregate silica and the performance of thermal insulation when 1% by weight of calcium laurate is added, and will be described more in detail in Example 2.

Table 11 shows the bulk densities of Example 1 and Comparison 1 at the respective amounts of addition of aggregate silica. Comparison 2 shows the bulk density in the case of aggregate silica powder alone.

The measurement of the thermal conductivity representing the performance of thermal insulation of the vacuum thermal insulating material was carried out at the average temperature of 24° C. with Auto-A(HC-072) manufactured by Eiko Seiki Co., Ltd. specified above.

The data of Table 10 show that the optimum amount of addition was 1.0% by weight when the aggregate silica powder alone was used as the surface modifier (Comparison 1). Example 1, wherein 2.0% by weight of calcium silicate powder was added, showed the better performance of thermal insulation than that of Comparison 1 with the amount of addition equal to 1.0% by weight by approximately 0.0003 kcal/mh°C. Mixing talc powder or calcium carbonate powder with aggregate silica powder resulted in the poorer performance of thermal insulation than that of Example 1.

The above results are attributable to the reasoning that calcium stearate powder that is a powder of a salt of fatty acid removes the molecular orientation on the surface of the organic powder, while silica powder is aggregated on the surface of the organic powder, which prevents ends of the organic powder having the irregular shape from being destroyed. This structure effectively prevents the closest packing in the vacuum thermal insulating material 1 of Example 1. This increases the ratio of gas phase in the vacuum thermal insulating material 1 of Example 1, reduces the heat conduction due to the solid contact, and improves the performance of thermal insulation. Talc powder and calcium carbonate powder used in Comparisons 2 and 3 have large solid thermal conductivities, which lead to the poorer performance of thermal insulation of the resulting vacuum thermal insulating materials.

The data of Table 11 show that Example 1 had approximately 25% smaller bulk density than that of the case using the aggregate silica powder alone as the core material (Comparison 2).

This is because the organic powder having a small specific gravity is used as the primary component.

As mentioned above, in the vacuum thermal insulating material 1 of Example 1, the salt of fatty acid decreases the coefficient of friction on the surface of the inorganic powder and the organic powder and solves the problem of frictional destruction of organic powder arising in the process of surface modification. This does not damage the proper bulking power of the organic powder, but effectively prevents the organic powder from being closely packed and enhances the ratio of gas phase. The vacuum thermal insulating material 1 of Example 1 accordingly has reduced heat conduction due to the solid contact and thus improved performance of thermal insulation. The vacuum thermal insulating material 1 of Example 1 includes the organic powder having a small specific gravity as a primary component, thereby being light in weight.

Example 2

The following describes a vacuum thermal insulating material 1 of Example 2.

In the vacuum thermal insulating material 1 of Example 2, calcium stearate powder used as the inorganic powder and expressed as (C$_{17}$H$_{35}$COO)$_2$Ca is packed into a core material 2. The inventors have experimentally proved that stearates can decrease the coefficient of friction on the surface of the organic powder more effectively than fatty acid salts having the smaller number of carbons, such as laurates and palmitates and that calcium stearate has a smaller increase in temperature by the exothermic heat produced in the mixing process for surface modification than those of the other stearates. This is attributable to the reasoning that calcium stearate (C$_{17}$H$_{35}$COO)$_2$Ca can suppress the exothermic heat produced in the course of dehydration reaction of the inorganic powder containing water.

The structure of the vacuum thermal insulating material 1 of Example 2 effectively protects the ends of organic powder from destruction due to the friction in the process of surface modification and reduces the inter-void distance formed by the modified organic powder while keeping the large gas phase volume. This structure enables the vacuum thermal insulating material 1 of Example 2 to reduce the number of pores having the inter-void distance of equal to or greater than the mean free path of the air under the pressure of 0.1 to 10 mmHg, which is readily realized in the industrial level, and accordingly possess the excellent performance of thermal insulation. Calcium stearate powder is mass produced in the industrial level and thereby does not increase the manufacturing cost.

Referring back to Table 10, Comparison 4 shows the relationship between the amount of addition of aggregate silica and the thermal conductivity representing the performance of thermal insulation when 1% by weight of calcium laurate is added as the powder of a salt of fatty acid.

As clearly shown in Table 10, addition of calcium laurate powder results in some improvement of the performance of thermal insulation, which is, however, significantly smaller than that observed in case that calcium stearate powder is added.

These results clearly show that calcium stearate powder is especially effective among the fatty acid salts which can decrease the coefficient of friction on the surface of the organic powder.

This is because calcium stearate has an especially large surface-active power among various fatty acid salts. When the water content is present on the surface of an organic substance, cations are hydroxylated while anions are bonded to protons. This forms a lubricating surface of the alkaline earth metal on the ground surface to enhance the slip, and effectively prevents the organic powder having a small hardness with respect to the surface modifier material from being destroyed. This structure can decrease the gas heat conduction without increasing the heat conduction due to the solid contact of the powdery mixture. Calcium stearate powder is mass produced in the industrial level and thereby does not increase the manufacturing cost.

As discussed above, the vacuum thermal insulating material including the powder of urethane foam waste as the organic powder and the salt of fatty acid that is industrially available at a low cost, especially calcium stearate powder, as the surface modifier can be manufactured at a relatively low cost.

Example 3

The following describes a vacuum thermal insulating material 1 of Example 3.

In the vacuum thermal insulating material 1 of Example 3, the core material 2 is prepared by mixing an organic powder, calcium stearate powder expressed as $(C_{17}H_{35}COO)_2Ca$, and silica powder (mean particle diameter=5 μm) expressed as $SiO_2$.

While the silica powder having the polar silanol groups is adsorbed to the surface of the organic powder, calcium stearate decreases the coefficient of friction on the surface of the organic powder and improves the dispersibility of silica powder. The CH-bond terminals of calcium stearate are aggregated to cover the surface of silica powder. This removes the water content adhering to the surface of silica, while the hydrophobic property of the COOCa terminal prevents further adsorption of the water molecules.

This structure effectively prevents the internal pressure of the vacuum thermal insulating material 1 from increasing due to the dissociation of adsorbed water molecules and thereby prevents the performance of the vacuum thermal insulating material 1 from being worsened with the elapse of time.

TABLE 12

Thermal Conductivity [kcal/mh ° C.] of Vacuum Thermal Insulating Material

| Amount of Inorganic Powder Added [wt %] | Example 3 | Comparison 1 | Comparison 2 |
|---|---|---|---|
| | Calcium Silicate/ Calcium Stearate | Talc/ Calcium Stearate | Calcium Carbonate/ Calcium Stearate |
| | Inorganic Powders | | |
| 1.0 | 0.048 | 0.0053 | 0.0053 |
| 2.0 | 0.0043 | 0.0052 | 0.0053 |
| 5.0 | 0.0046 | 0.0053 | 0.0054 |
| 10.0 | 0.0050 | 0.0055 | 0.0055 |

TABLE 13

Thermal Conductivity [kcal/mh ° C.] of Vacuum Thermal Insulating Material

| Days [day] | Example 3 | Comparison 1 | Comparison 2 |
|---|---|---|---|
| Initial Stage | 0.0043 | 0.0052 | 0.0053 |
| 50 | 0.0044 | 0.0057 | 0.0058 |
| 100 | 0.0045 | 0.0060 | 0.0062 |
| 150 | 0.0045 | 0.0062 | 0.0063 |

Example 3 in Table 12 shows the relationship between the amount of calcium silicate powder added and the thermal conductivity representing the performance of thermal insulation in case that calcium silicate powder is used as the surface modifier and 1% by weight of calcium stearate powder is added. Comparison 1 shows the case in which talc powder is added not as the lubricant such as calcium stearate powder but as the surface modifier. Comparison 2 shows the case in which calcium carbonate powder is added as the surface modifier.

Table 13 shows variations in thermal conductivity representing the performance of thermal insulation of Example 3 and Comparisons 1 and 2 of Table 12 in the atmosphere of 30° C. after 50 days, 100 days, and 150 days.

As clearly shown in Table 12, calcium silicate powder used as the surface modifier had the effects equivalent to those of the aggregate silica powder, while talc powder or calcium carbonate powder used as the surface modifier had substantially no effects.

The data of Table 13 show the following. In Comparisons 1 and 2 using inorganic powders other than calcium silicate powder as the surface modifier, the performance of thermal insulation after 150 days became worse than that of the initial stage by 0.001 kcal/mh°C. In Example 3 using calcium silicate powder as the surface modifier, on the other hand, the deterioration was as small as 0.0002 kcal/mh°C.

As mentioned above, the calcium silicate powder of Example 3 had the effects similar to those of the aggregate silica powder of Example 2.

While the silica powder or silicate powder having the polar silanol groups is adsorbed to the surface of the organic powder, calcium stearate enhances the dispersion of the silica powder or silicate powder and the CH-bond terminals of calcium stearate are aggregated to cover the surface of the silica powder or silicate powder. This structure effectively removes the water molecules adsorbed to the surface of silica or calcium silicate and prevents further aggregation of the water molecules.

The silica powder or silicate powder has a number of silanol groups on its surface as the characteristic crystal structure and accordingly has a strong polarity. Addition of even a very small amount enables the surface modification and thereby reducing the size of pores formed by the aggregates.

In the vacuum thermal insulating material 1 of Example 3, this results in reducing the effects of gas heat conduction due to the collision of molecules, improving its performance, and enabling utilization of the waste. The vacuum thermal insulating material 1 of Example 3 can accordingly be manufactured at a remarkably low cost.

The inorganic powder, such as silica or calcium silicate, has a very fine structure and thereby an extremely large specific surface area. This leads to adsorption of the water content in the atmosphere, which is dissociated in the vacuum thermal insulating material to increase the internal pressure, thereby worsening the performance of thermal insulation with the elapse of time.

The vacuum thermal insulating material 1 of Example 3 includes calcium stearate, so that the silanol groups remaining after the modification of the organic powder can be covered with the hydrophobic calcium stearate film. This structure effectively interferes with adsorption of the water content, prevents an increase in internal pressure due to the dissociation of the adsorbed water molecules, and prevents the performance of thermal insulation of the vacuum thermal insulating material from worsening with the elapse of time.

Example 4

The following describes a vacuum thermal insulating material 1 of Example 4.

In general, foamed plastics are light in weight and have large compression strength. It is accordingly rather difficult to pulverize the foamed plastics by volume reduction with a cutter mill or the like. It is thereby difficult to completely crush the closed cells included in the foamed plastics, so that the light foamed plastics can not be effectively used as the thermal insulation in the vacuum thermal insulating material.

Milling, which is one process of surface reduction, is applied to the manufacture of the vacuum thermal insulating material 1 of Example 4. This ensures effective pulverization of foamed plastics. The vacuum thermal insulating material 1 accordingly includes the light foamed plastics, thereby being light in weight.

In the vacuum thermal insulating material 1 of Example 4, the core material 2 is prepared by pressing foamed plastics against an abrasive cloth having a grit of 150 μm with the force of approximately 1 kg/cm² for the purpose of pulverization and mixing the pulverized powder with calcium stearate powder (mean particle diameter=0.1 μm) and silica powder (mean particle diameter=5 μm) expressed as $SiO_2$.

In the vacuum thermal insulating material 1 of Example 4, foamed plastics are ground by milling with an abrasive cloth, which is one process of surface reduction, as mentioned above. A cutter mill includes a plurality of blade-like cutters that are rotated together to grind the material. The method applied to the manufacture of the vacuum thermal insulating material 1 of Example 4 can further reduce the ground particle size, which is limited to 180 μm by the volume reduction, for example, with the cutter mill.

As mentioned above, the vacuum thermal insulating material 1 of Example 4 can utilize the light foamed plastics without lowering the performance of thermal insulation due to the evolution of a gas with the elapse of time.

The milling process applied to Example 4 can be carried out with an inexpensive equipment, for example, using abrasive paper in place of the abrasive cloth. This further reduces the manufacturing cost of the vacuum thermal insulating material 1 of Example 4.

TABLE 14

Bulk Density [kg/m³] of Foamed Polyurethane Foam

| | Method of Grinding | |
|---|---|---|
| Mean Particle Diameter [μm] | Example 4 Milling | Comparison Size Reduction with Cutter |
| 100 | 70 | — |
| 150 | 43 | — |
| 180 | 38 | 50 |

Example 4 of Table 14 shows the bulk density of foamed polyurethane foam obtained by milling. Comparison shows the bulk density of foamed polyurethane foam ground with a cutter mill. The bulk density represents the density of accumulated powder having voids. The process of grinding with a cutter mill includes the steps of roughly grinding to the mean particle diameter of approximately 1 mm with a roll mill and pulverizing the rough particles with a pulverizer or a cutter mill. Both the mills used were manufactured by Hosokawa Micron Co., Ltd., Osaka, Japan.

Referring to Table 14, there was a difference of 12 kg/m³ in bulk density between Example 4 and Comparison at the identical mean particle diameter of 180 μm. The grinding process with a cutter mill could not pulverize the rough particles to the size of 180 μm or less.

As mentioned above, the powder formed by milling has a smaller bulk density than that of the powder formed with a cutter mill. This is because milling pulverizes foamed urethane foam without damaging the bulking power. The vacuum thermal insulating material 1 of Example 4 is accordingly light in weight.

Foamed plastics that are not suitable for disposal but are recycled at a low cost can be applied to the vacuum thermal insulating material 1 of Example 4. This reduces the manufacturing cost of the vacuum thermal insulating material 1 of Example 4.

Example 5

The following describes a thermally insulating case 4 of Example 5 using the vacuum thermal insulating material 1.

The thermally insulating case 4 of Example 5 includes the vacuum thermal insulating material 1 specified as any one of Examples 1 to 5 mentioned above, a thermal insulating foamed material 5 composed of hard urethane foam, an outer casing, and an inner casing 7. The vacuum thermal insulating material 1 is attached to the inner wall of either the inner casing 7 or the outer casing 6. The thermal insulating foamed material 5 is composed of foamed polyurethane foam using cyclopentane (performance of thermal insulation=0.0130 kcal/mh°C.). The outer casing 6 is composed of a steel plate of 500 μm thick, and the inner casing 7 is made of an ABS resin of 600 μm thick. The dimensions of the vacuum thermal insulating material 1 are 0.5 m×0.5 m×0.02 m.

The thermally insulating case 4 thus constructed has high reliability and excellent performance of thermal insulation. A long-term use of the thermally insulating case 4 thus does not significantly lower the performance of thermal insulation. The refrigerator or freezer using the thermally insulating case 4 does not cause the compressor to be excessively operated with an abrupt change of the outside temperature, thereby solving the problems, such as deterioration of the quality of food kept in the refrigerator.

Embodiment 5

The following describes a vacuum thermal insulating material 1 and a thermally insulating case 4 using the vacuum thermal insulating material 1 as Embodiment 5 of the present invention. The structures of the vacuum thermal insulating material 1 and the thermally insulating case 4 of Embodiment 5 are identical with those of Embodiment 1 shown in and described with FIGS. 1 and 2 and are thus not described here specifically.

In the vacuum thermal insulating material 1 of Embodiment 5, the core material 2 includes ground urethane foam as an organic powder, wet silica powder as an inorganic powder, and active carbon powder having pores 5 to 20% greater than the molecular diameter of nitrogen gas as an adsorbent. The core material 2 further includes aluminum powder having a reflectance of 0.9 or more as a radiation reducing agent. The core material 2 is sealed in a non-woven fabric having gas permeability and then arranged in an outer member 3 composed of a metal-plastic film laminate. The vacuum thermal insulating material 1 of Embodiment 5 is obtained by reducing the internal pressure of the outer member 3 and sealing the outer member 3 under reduced pressure.

Reduction of weight is an important issue regarding the powdery vacuum thermal insulating material. An increase in weight of the powdery vacuum thermal insulating material is mainly attributable to the closest packing arrangement of the ball-like powder. In order to reduce the weight, it is required to control the packing arrangement by regulating the shape of the powder. In the vacuum thermal insulating material 1 of Embodiment 5, the shape of the organic powder included in the core material 2 is limited to the needle-like form. The bulking power of the organic powder prevents the organic powder from forming the closest packing arrangement, thereby reducing the weight of the vacuum thermal insulating material 1 of Embodiment 5.

TABLE 15

Relationship between Shape of Particles, Particle Diameter, and Bulk Density

| | | Shape of Particles | |
|---|---|---|---|
| | | Embodiment 5 Needle-like Form | Comparison Ball-like Form |
| | | Bulk Density [kg/m$^3$] | |
| Particle Diameter | 50 μm | 116 | 153 |
| | 70 μm | 112 | 148 |
| | 90 μm | 110 | 140 |

Table 15 shows the relationship between the shape of particles in the ground powder of urethane foam applied to the core material, the particle diameter, and the bulk density. The ground powder of urethane foam of Embodiment 5 had the needle-like shape, whereas that of Comparison had the ball-like shape. The shape of particles was varied by the grinding process; grinding with a cutter mill gave the needle-like particles and grinding with a ball mill gave the ball-like particles.

The cutter mill includes a plurality of blade-like cutters that are rotated together for size reduction. The ball mill has a steel ball used as a grinding medium in a rotating cylinder for size reduction.

As clearly shown in Table 15, the bulk density increases with a decrease in particle diameter, irrespective of the shape of particles. This is because the aggregation form of fine powder becomes close to the closest packing arrangement.

Compared with the ball-like powder of Comparison, the needle-like powder of the vacuum thermal insulating material 1 of Embodiment 5 attains the smaller bulk density and further reduction of the weight. The needle-like shape of the particles enables the bulking power to act against the aggregation of powder and thus interferes with the closest packing arrangement. The vacuum thermal insulating material 1 of Embodiment 5 accordingly has a small bulk density and is light in weight.

As mentioned above, the restriction of the shape of particles to the needle-like form realizes reduction of the weight, which has been an important issue regarding the powdery vacuum thermal insulating material.

The requirements relating to the performance of the vacuum thermal insulating material are to ensure the reliability over a long time period, to improve the performance of thermal insulation, and to reduce the manufacturing cost.

While the vacuum thermal insulation material is used for a long time, the air and an organic gas of hydrocarbons used as the foaming agent of urethane foam gradually invade the vacuum thermal insulating material. This results in decreasing the degree of vacuum and increasing the gas thermal conductivity, so as to lower the performance of thermal insulation.

This makes it impossible to use the vacuum thermal insulating material for a long time, that is, to ensure the reliability over a long time period. It is accordingly required to adsorb and remove the gas molecules, such as the organic gas, invading from the outside.

The processes applicable to adsorb and remove the gas molecules include chemisorption and physisorption. The process of chemisorption adsorbs the gas molecules through a chemical reaction. The chemisorption has a large binding energy to the gas molecules and prevents the gas molecules once adsorbed from being readily released. The chemical reaction, however, allows evolution of a by-product gas, so that the chemisorption is not suitable for the vacuum thermal insulating material.

The process of physisorption, on the other hand, takes the gas molecules into small voids of the powder by the capillarity and adsorbs the gas molecules by the surface adsorption energy.

The physisorption, however, has only a little adsorption energy. In case that the gas molecules are taken into a relatively large space, the kinetic energy of the gas molecules becomes greater than the adsorption energy and the gas molecules of interest can not be adsorbed for the purpose of removal. In order to adsorb and remove the gas molecules by the process of physisorption, it is required to restrict the size of pores included in the powder used as an adsorbent.

Taking into account the above description, in the vacuum thermal insulating material 1 of Embodiment 5, the inorganic powder having pores 5% to 20% greater than the diameter of the adsorbed molecules is used as an adsorbent. This lessens the kinetic energy of the gas molecules taken into the pores by the capillarity and makes the adsorption energy predominant. The physisorption is then applicable to the vacuum thermal insulating material 1 of Embodiment 5, which can thus be used over a long time period.

TABLE 16

Elapse of Days and Degree of Vacuum in Vacuum Thermal Insulating Material

| | | Embodiment 5 | | | Comparison | | | |
|---|---|---|---|---|---|---|---|---|
| | | A | B | C | a | b | c | d |
| Size of Pores (Ratio to Molecular Diameter of Nitrogen)) | | 105% | 110% | 120% | 103% | 125% | 140% | |
| | | Performance of Thermal Insulation [10$^{-4}$kcal/mh ° C.] | | | | | | |
| Elapse of Days | Initial Stage | 50 | 50 | 50 | 50 | 50 | 50 | 50 |
| | 30 Days | 50 | 50 | 50 | 56 | 50 | 50 | 58 |
| | 60 Days | 50 | 50 | 50 | 65 | 52 | 54 | 65 |
| | 90 Days | 50 | 50 | 50 | 74 | 58 | 61 | 75 |

Figure 5:
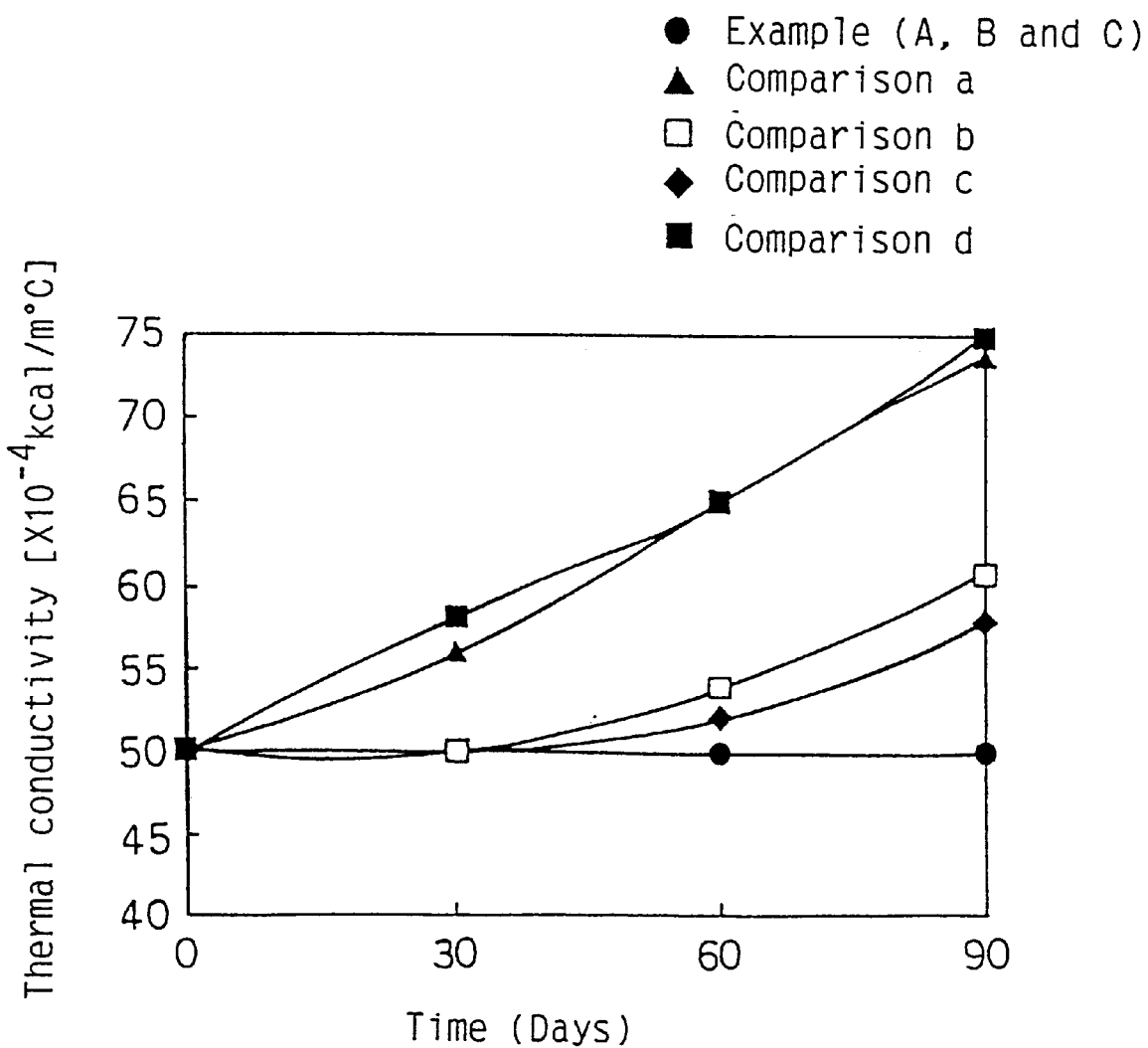
FIG. 5 is a characteristic chart showing variations in thermal conductivity of vacuum thermal insulating materials with time in Embodiment 5 of the present invention.

Table 16 and FIG. 5 respectively show variations in degree of vacuum measured against the elapse of days when the vacuum thermal insulating material is arranged in a nitrogen atmosphere. Active carbons having pores 5%, 10%, and 20% greater than the diameter of nitrogen molecules were respectively used as the adsorbent in A, B, and C of Embodiment 5 in Table 16. In Comparisons a, b, and c, on the other hand, an active carbon having a 3%-greater pores, which are smaller than 5%-greater pores (Comparison a) and active carbons having 25%-greater and 40%-greater pores, which are larger than 20%-greater pores (Comparison b) and (Comparison c) were respectively used as the adsorbent. In Comparison d, the vacuum thermal insulating material did not include any adsorbent.

In order to evaluate the effects of the adsorbent more accurately, a polyethylene film of 15 μm thick with excellent gas permeability was used for the outer member and the initial degree of vacuum was set to 0.1 mmHg.

As clearly seen in Table 16 and FIG. 5, substantially no variation in degree of vacuum was observed in Embodiment 5 even after 90 days, whereas the degree of vacuum worsened in any adsorbents of Comparisons. When the physisorption using, for example, active carbon, is applied to adsorb the gas molecules, importance is placed on the relationship between the diameter of the gas molecules to be adsorbed and the diameter of pores of the adsorbent. In the vacuum thermal insulating material 1 of Embodiment 5, the diameter of pores is only 5% to 20% greater than the diameter of the gas molecules to be adsorbed. This significantly lowers the kinetic energy of the gas molecules taken into the pores by the capillarity and makes the adsorption energy predominant. The physisorption is thus applicable to the vacuum thermal insulating material. The vacuum thermal insulating material 1 of Embodiment 5 utilizing the process of physisorption maintains the performance of thermal insulation without worsening the degree of vacuum over a long time period.

Factors attaining heat conduction in the powdery vacuum thermal insulating material include solid heat conduction due to the contact of particles in the powder, gas heat conduction due to the collision of gas molecules in the pores of the powder, and radiation heat conduction. For the improvement in performance of thermal insulation, it is required to reduce the respective factors of heat conduction.

The powdery vacuum thermal insulating material 1 has very small voids formed by the powder. This results in little effects of gas heat conduction due to the collision of gas molecules. The effect of solid heat conduction due to the contact of particles in the powder can be reduced by controlling the shape of the organic powder. The effect of heat conduction by radiation should also be decreased to improve the performance of thermal insulation.

In order to realize the reduction of heat conduction by radiation, it is important to interfere with absorption of the vibrational energy due to radiation. The property regarding absorption of the vibrational energy is characteristic of the material and expressed as the reflectance. The high reflectance enables reflection of the vibrational energy and thereby reduces the effect of heat conduction by radiation. It is accordingly important to optimize the reflectance.

In the vacuum thermal insulating material 1 of Embodiment 5, the reflectance is limited to be equal to or greater than 0.9. The vacuum thermal insulating material 1 of Embodiment 5 accordingly had little heat conduction by radiation and improved performance of thermal insulation.

TABLE 17

|  | Embodiment 5 | | | Comparison | | |
| --- | --- | --- | --- | --- | --- | --- |
| Reflectance | 0.9 | 0.95 | 0.98 | 0.7 | 0.8 | 0.85 |
| Performance of Thermal Insulation [$10^{-4}$/mh ° C.] | 48 | 47 | 46 | 50 | 50 | 50 |

Table 17 shows the performance of thermal insulation in Embodiment 5 when aluminum powder having the hot wire reflectance of not less than 0.9 was added to reduce the heat conduction by radiation and improve the performance of thermal insulation. Comparison shows the performance of thermal insulation when a metal powder having the reflectance of less than 0.9 was added. For the measurement under the identical conditions, the amount of addition was fixed to 5% by weight and the degree of vacuum was regulated to 0.1 mmHg. The performance of thermal insulation was expressed as the thermal conductivity measured at the average temperature of 24° C. with a device for measuring thermal conductivity AUTO-A manufactured by Eiko Seiki Co., Ltd. specified aforementioned.

Referring to Table 17, the performance of thermal insulation was improved in Embodiment 5 wherein aluminum powder having the reflectance of not less than 0.9 was added. Comparison using the metal powder having the reflectance of less than 0.9, on the other hand, caused absorption of the vibrational energy. Comparison could not reduce the heat conduction by radiation, thereby not improving the performance of thermal insulation.

Application of urethane foam waste as the organic powder decreases the materials cost and thus remarkably reduces the whole manufacturing cost. The urethane foam waste, however, can not be pulverized by grinding. This increases the size of the voids formed by the aggregate of organic powder and enhances the gas heat conduction due to the collision of gas molecules.

One method applicable to solve the above problem adds an inorganic powder for surface modification of the organic powder, which improves the fluidity of the powder and decreases the size of the voids formed by the aggregate. Addition of an inorganic powder implements surface modification because of the mechanochemical reaction that occurs when the process of mixing an organic powder with an inorganic powder and stirring the mixture gives the kinetic energy. This effect is varied with the activity of the inorganic powder added. The restriction of the inorganic powder is accordingly important to realize the cost reduction.

Wet silica powder is used as the inorganic powder in Embodiment 5. Because of the characteristics of the manufacturing process, the wet silica powder has a greater number of silanol groups on its surface than the dry silica powder. Addition of even a very small amount of the wet silica powder having a strong polarity enables surface modification, thereby reducing the size of pores formed by the aggregate. Even when the urethane foam waste is used as the organic powder, this decreases the effect of gas heat conduction due to the collision of gas molecules. This structure ensures the high performance of thermal insulation and enables utilization of the waste to attain the remarkable cost reduction.

TABLE 18

| | Embodiment 5 | | | Comparison | | | |
| --- | --- | --- | --- | --- | --- | --- | --- |
| Silica Powders | Wet Silica | | | Dry Silica | | | None |
| Amount of Addition [wt %] | 5 | 10 | 15 | 5 | 10 | 15 | 0 |
| Performance of Thermal Insulation [$10^{-4}$kcal/mh ° C.] | 55 | 50 | 45 | 60 | 58 | 55 | 65 |

Table 18 shows the relationship between the amount of addition and the performance of thermal insulation when wet silica powder as the embodiment and dry silica powder as the comparison were respectively added to the inorganic powder used as a modifier. For the measurement under the identical conditions, the amount of addition of silica powder was set in three levels, that is, 5, 10, and 15% by weight, and the degree of vacuum was regulated to 0.1 mmHg. The thermal conductivity representing the performance of thermal insulation was measured at the average temperature of 24° C. with a device for measuring thermal conductivity AUTO-A manufactured by Eiko Seiki Co., Ltd. specified aforementioned.

As clearly shown in Table 18, compared with the respective Comparisons, the embodiment using the wet silica powder has the improved performance of thermal insulation. Because of the characteristics of the manufacturing process, the wet silica powder has a greater number of silanol groups on its surface than the dry silica powder. Addition of even a very small amount of the wet silica powder having a strong polarity enables surface modification. Even when the urethane foam waste is used as the organic powder, this decreases the effect of gas heat conduction due to the collision of gas molecules. Application of the wet silica powder to the embodiment ensures the high performance of thermal insulation and enables utilization of the waste to attain the remarkable cost reduction.

The thermally insulating case 4 of the embodiment has a structure in which the vacuum thermal insulating material 1 of the embodiment using the wet silica powder is arranged on one surface of a thermal insulating foamed material 5 that is composed of hard urethane foam, and accommodated in a sealed space defined by an outer casing 6 and an inner casing 7. The vacuum thermal insulating material 1 is attached to the inner wall of either the inner casing 7 or the outer casing 6 in the sealed space. The dimensions of the vacuum thermal insulating material 1 are 1.0 m×0.5 m×0.02 m.

As mentioned above, the vacuum thermal insulating material 1 has excellent performance of thermal insulation and keeps the high reliability over a long time period. The thermally insulating case constructed as above accordingly maintains the high performance of thermal insulation over a long time period. The refrigerator using the thermally insulating case 4 does not lead to an excessive operating efficiency of the compressor with an abrupt change of the outside temperature, thereby solving the problems, such as deterioration of the quality of food kept in the refrigerator.

As discussed previously, in the vacuum thermal insulating material 1 of Embodiment 5, the shape of the organic powder included in the core material 2 is restricted to the needle-like form. The bulking power of the organic powder effectively prevents the vacuum thermal insulating material 1 from having the closest packing arrangement, thereby reducing the weight of the vacuum thermal insulating material 1.

In the vacuum thermal insulating material 1 of Embodiment 5, the inorganic powder having pores 5% to 20% greater than the diameter of the adsorbed molecules is used as the adsorbent. This lessens the kinetic energy of the gas molecules taken into the pores by the capillarity and makes the adsorption energy predominant. The physisorption is then applicable to the vacuum thermal insulating material 1 of Embodiment 5, which can thus be used over a long time period.

The powdery material having the reflectance of 0.9 or more is added to the vacuum thermal insulating material 1 of Embodiment 5. This prevents the vibrational energy due to the radiation from being absorbed. The vacuum thermal insulating material 1 of Embodiment 5 can thus reduce the heat conduction by radiation and has the improved performance of thermal insulation.

In the vacuum thermal insulating material 1 of Embodiment 5, the inorganic powder used as the surface modifier is restricted to the wet silica powder. Even when the urethane foam waste is used as the organic powder, this decreases the effect of gas heat conduction due to the collision of gas molecules and ensures the high performance of the vacuum thermal insulating material 1 of Embodiment 5.

The vacuum thermal insulating material 1 of Embodiment 5 enables utilization of the waste to attain the remarkable cost reduction.

The vacuum thermal insulating material 1 keeps the high reliability over a long time period and has excellent performance of thermal insulation. The thermally insulating case 4 constructed by laying the vacuum thermal insulating material 1 and the thermal insulating foamed material 5 one upon the other maintains the high performance of thermal insulation over a long time period. The refrigerator or freezer using the thermally insulating case 4 of Embodiment 5 does not cause the compressor to be excessively operated with an abrupt change of the outside temperature, thereby solving the problems, such as deterioration of the quality of food kept in the refrigerator.

Embodiment 6

The following describes a vacuum thermal insulating material 1 and a thermally insulating case 4 using the vacuum thermal insulating material 1 as Embodiment 6 of the present invention. The structures of the vacuum thermal insulating material 1 and the thermally insulating case 4 of Embodiment 6 are identical with those of Embodiment 1 shown in and described with FIGS. 1 and 2 and are thus not described here specifically.

The vacuum thermal insulating material 1 is obtained by packing a core material 2 composed of ground powder of urethane foam and synthetic silica powder into a non-woven fabric having gas permeability, arranging the packed core material 2 in an outer member 3 composed of a metal-plastic film laminate, and sealing the outer member 3 under reduced pressure.

TABLE 19

| Volume Ratio of Gas Phase [%] | Thermal Conductivity [kcal/mh ° C.] |
| --- | --- |
| 85 | 0.0045 |
| 75 | 0.0045 |
| 65 | 0.0045 |
| 60 | 0.0050 |
| 55 | 0.0065 |
| 50 | 0.0075 |

Table 19 shows the relationship between the volume ratio of gas phase in the core material 2 and the thermal conductivity representing the performance of thermal insulation. The volume ratio of gas phase is calculated according to Equation (1) given below:

Volume Ratio of Gas Phase (%)=(1−Bulk Density of Powder/True Density of Powder)×100     (1)

The bulk density represents the density of a certain quantity of powder including voids under the condition that a number of particles are accumulated in the presence of voids. The true density represents the actual density of the solid portion of the powdery material excluding the voids and is given as the mass per unit volume.

Table 19 shows that the performance of thermal insulation is lowered with a decrease in volume ratio of gas phase. The performance of thermal insulation is remarkably lowered when the volume ratio of gas phase becomes less than 60%.

This is attributable to the reasoning that a decrease in volume ratio of gas phase increases the contact of particles and thereby enhances the solid heat conduction. When the volume ratio of gas phase becomes smaller than 60%, the particles approach to one another more closely. This makes the aggregation energy larger than the kinetic energy of the powder, and thereby leading to the closest packing arrangement. The closest packing arrangement remarkably increases the solid heat conduction and significantly worsens the performance of thermal insulation.

In the vacuum thermal insulating material 1 of Embodiment 6, the volume ratio of gas phase is restricted to be equal to or greater than 60%. This structure effectively prevents the closest packing arrangement of the powder and improves the performance of thermal insulation.

TABLE 20

Thermal Conductivity [kcal/mh ° C.] of Vacuum Thermal Insulating Material

| Mean Particle Diameter Elapse of Days | 90 μm | 120 μm | 150 μm | 160 μm | 180 μm |
|---|---|---|---|---|---|
| Initial Stage | 0.0045 | 0.0045 | 0.0045 | 0.0045 | 0.0045 |
| 30 Days | 0.0045 | 0.0045 | 0.0045 | 0.0045 | 0.0045 |
| 60 Days | 0.0045 | 0.0045 | 0.0045 | 0.0045 | 0.0050 |
| 90 Days | 0.0047 | 0.0047 | 0.0047 | 0.0052 | 0.0057 |
| 120 Days | 0.0048 | 0.0048 | 0.0048 | 0.0059 | 0.0061 |
| 150 Days | 0.0048 | 0.0048 | 0.0048 | 0.0062 | 0.0069 |

Table 20 shows variations in thermal conductivity representing the performance of thermal insulation with the elapse of time for various mean particle diameters of ground urethane foam.

As clearly shown in Table 20, no significant time-based variation in performance of thermal insulation was observed for the mean particle diameter of 150 μm or less, whereas the performance of thermal insulation was remarkably lowered with the time for the mean particle diameter of greater than 150 μm. Urethane foam is ground to particles of appropriate mean diameter, which can then be used as an organic powder. Urethane foam has closed cells, so that the inappropriate diameter of ground particles causes a gas such as CFC to be present in the closed cells. The time-based diffusion of the gas from the closed cells in such urethane foam powder worsens the degree of vacuum and lowers the performance of thermal insulation.

It is thus very important to restrict the diameter of ground particles when urethane foam is used as the organic powder.

In Embodiment 6, the mean particle diameter is restricted to be equal to or smaller than 150 μm. This effectively prevents the closed cells from remaining when ground powder of urethane foam is used as the organic powder. The structure of the vacuum thermal insulating material 1 of Embodiment 6 prevents the degree of vacuum from worsening due to the time-based diffusion of the gas from the closed cells, thereby solving the problem of a lowering of the performance of thermal insulation.

TABLE 21

Thermal Conductivity [kcal/mh ° C.] of Vacuum Thermal Insulating Material

| Bulk Density of Organic Powder | Amount of Inorganic Powder Added [wt %] | | | |
|---|---|---|---|---|
| [kg/m³] | 0 | 5 | 10 | 20 |
| 120 | 0.0050 | 0.0048 | 0.0046 | 0.0044 |
| 140 | 0.0050 | 0.0048 | 0.0046 | 0.0044 |
| 150 | 0.0050 | 0.0048 | 0.0046 | 0.0044 |
| 170 | 0.0050 | 0.0056 | 0.0060 | 0.0070 |

TABLE 21-continued

Thermal Conductivity [kcal/mh ° C.] of Vacuum Thermal Insulating Material

| Bulk Density of Organic Powder | Amount of Inorganic Powder Added [wt %] | | | |
|---|---|---|---|---|
| [kg/m³] | 0 | 5 | 10 | 20 |
| 180 | 0.0050 | 0.0058 | 0.0064 | 0.0076 |
| 190 | 0.0050 | 0.0060 | 0.0071 | 0.0080 |

1/ Amount of Inorganic Powder Added [% by weight]
2/ Bulk Density of Organic Powder Table 21 shows variations in thermal conductivity representing the performance of thermal insulation when the bulk density of the organic powder and the amount of addition of the inorganic powder are varied.

Referring to Table 21, addition of the inorganic powder improves the performance of thermal insulation when the bulk density is equal to or smaller than 150 kg/m³. Addition of the inorganic powder, however, lowers the performance of thermal insulation when the bulk density exceeds 150 kg/m³.

Addition of the inorganic powder improves the performance of thermal insulation when the bulk density is equal to or smaller than 150 kg/m³ because of the following reasons.

Addition of the inorganic powder improves the fluidity of the powder and thereby attains the close packing arrangement of the powder. The voids greater than the mean free path of the air accordingly disappear, and the gas heat conduction due to the collision of gas molecules is reduced. This enables the vacuum thermal insulating material including the inorganic powder added to the organic powder to have the improved performance of thermal insulation.

In case that the organic powder itself is in a very closely packed, addition of the inorganic powder further enhances the close packing arrangement, thereby increasing the solid heat conduction in the powdery mixture and lowering the performance of thermal insulation. Restriction of the packing degree of the organic powder is accordingly very important for the improvement in performance of thermal insulation.

In the vacuum thermal insulating material 1 of Embodiment 6, the bulk density is selected as an index representing the packing rate of the organic powder, and the bulk density of the organic powder is restricted to be equal to or smaller than 150 kg/m³. This realizes the appropriate packing rate of the organic powder and enables the performance of thermal insulation to be improved by addition of the inorganic powder.

TABLE 22

Thermal Conductivities [kcal/mh ° C.] Against Various Degrees of Vacuum and Mean Pore Diameters

| Degree of Vacuum | Mean Pore Diameter | | | |
|---|---|---|---|---|
| [mmHg] | 80 μm | 100 μm | 120 μm | 140 μm |
| 0.1 | 0.0050 | 0.0050 | 0.0050 | 0.0050 |
| 0.5 | 0.0050 | 0.0050 | 0.0054 | 0.0056 |
| 1.0 | 0.0050 | 0.0050 | 0.0061 | 0.0062 |
| 5.0 | 0.0055 | 0.0055 | 0.0069 | 0.0072 |

TABLE 22-continued

Thermal Conductivities [kcal/mh ° C.] Against Various Degrees of Vacuum and Mean Pore Diameters

| Degree of Vacuum | Mean Pore Diameter | | | |
|---|---|---|---|---|
| [mmHg] | 80 μm | 100 μm | 120 μm | 140 μm |
| 10.0 | 0.0065 | 0.0066 | 0.0074 | 0.0079 |
| 15.0 | 0.0067 | 0.0068 | 0.0088 | 0.0091 |

Table 22 shows the relationship between the thermal conductivity representing the performance of thermal insulation and the mean pore diameter of the powdery mixture, which is obtained by adding the inorganic powder to the organic powder, at various degrees of vacuum. The mean pore diameter is calculated from the volume of the pores in the whole powder and the specific surface area and shows the mean value of the pores in the powder.

Referring to Table 22, when the mean pore diameter exceeds 100 μm, a variation in degree of vacuum abruptly lowers the performance of thermal insulation in the vacuum thermal insulating material.

This is attributable to the reasoning that a decrease in degree of vacuum leads to the collision of gas molecules in the pores and exponentially increases the gas heat conduction, under the condition that the pore diameter of the powdery mixture is greater than the mean free path of the air. The state of varying the performance of thermal insulation with a variation in degree of vacuum represents a high pressure dependence. A drop in pressure dependence is very important to improve the reliability of products including the vacuum thermal insulating material. It is thus required to control the pore diameter of the powdery mixture.

In the vacuum thermal insulating material 1 of Embodiment 6, the mean pore diameter is restricted to be equal to or smaller than 100 μm. This mostly eliminates the pores greater than the mean free path of the air in the vacuum thermal insulating material 1 of Embodiment 6 and lowers the pressure dependence.

The thermally insulating case 4 of Embodiment 6 includes the vacuum thermal insulating material 1 discussed above, a thermal insulating foamed material 5 composed of hard urethane foam, an outer casing 6, and an inner casing 7. The vacuum thermal insulating material 1 of the thermally insulating case 4 is attached to the inner wall of either the inner casing 7 or the outer casing 6. The dimensions of the vacuum thermal insulating material 1 are 1.0 m×0.5 m×0.02 m.

As mentioned above, the vacuum thermal insulating material 1 of Embodiment 6 has excellent performance of thermal insulation and very low pressure dependence. The thermally insulating case 4 constructed as above thus keeps the high performance of thermal insulation over a long time period. The refrigerator or freezer using the thermally insulating case 4 does not cause the compressor to be excessively operated with an abrupt change of the outside temperature, thereby solving the problems, such as deterioration of the quality of food kept in the refrigerator.

As mentioned above, in the vacuum thermal insulating material 1 of Embodiment 6, the volume ratio of gas phase in the core material 2 is restricted to be equal to or higher than 60%, which leads to less contact of the particles. The vacuum thermal insulating material 1 of Embodiment 6 has little solid heat conduction via the contact of the particles and possesses the high performance of thermal insulation.

In the vacuum thermal insulating material 1 of Embodiment 6, the mean particle diameter of the organic powder is restricted to be equal to or smaller than 150 μm, so that the ground powder of foamed urethane foam including the closed cells is applicable. This structure solves the problems of worsened degree of vacuum, which is caused by diffusion of a gas from the closed cells remaining in the foamed urethane foam, and the resulting drop in performance of thermal insulation. The urethane foam waste can thus be applicable to the vacuum thermal insulating material 1 of Embodiment 6, which leads to the remarkable cost reduction.

In the vacuum thermal insulating material 1 of Embodiment 6, the bulk density of the organic powder is restricted to be equal to or lower than 150 kg/m3. This structure enables the inorganic power added to the organic powder to improve the performance of thermal insulation without causing the excess contact of the particles.

In the vacuum thermal insulating material 1 of Embodiment 6, the mean pore diameter is restricted to be equal to or smaller than 100 μm in the powdery mixture obtained by mixing the organic powder with the inorganic powder. This structure lessens the collision of gas molecules in the pores at a low degree of vacuum of 0.1 mmHg that can be readily realized at a low cost in the industrial level. The vacuum thermal insulating material 1 of Embodiment 6 accordingly has excellent performance of thermal insulation and low pressure dependence.

The thermally insulating case 4 of Embodiment 6 includes the thermal insulating foamed material and the vacuum thermal insulating material 1 arranged in a space defined by the case. The thermally insulating case 4 of Embodiment 6 accordingly maintains the excellent performance of thermal insulation over a long time period.

Although the present invention is described as preferred embodiments in some details, the disclosure of the preferred embodiments may be changed, altered, and modified in the particulars of the structure. It is understood that various combinations and arrangements of the respective elements can be realized without departing from the scope or spirit of the invention claimed below.

INDUSTRIAL APPLICABILITY

The vacuum thermal insulating material of the present invention and the thermally insulating case using the vacuum thermal insulating material are applicable as heat insulation in refrigerators, freezers, and the like. The refrigerators and freezers to which the present invention is applied have excellent performance of thermal insulation, are light in weight and manufactured at a low cost, and maintain the high performance of thermal insulation over a long time period.

What is claimed is:

1. A vacuum thermal insulating material comprising a core material and an adsorbent, which are packed in an outer member, said core material comprising at least a powder of organic material which has a specific surface area of not greater than 20 m²/g, and a powder of inorganic material which has a specific surface area of greater than 50 m²/g.

2. A vacuum thermal insulating material in accordance with claim 1, wherein said powder of organic material in said core material comprises ground powder of plastic foam.

3. A vacuum thermal insulating material in accordance with claim 1, wherein a fill of the powder of inorganic material in said core material is not less than 2 percent by weight and not greater than 50 percent by weight.

4. A vacuum thermal insulating material in accordance with claim 1, said vacuum thermal insulating material comprising a powder of inorganic material having a needle-like crystal form as a surface modifier for said powder of organic material.

5. A vacuum thermal insulating material in accordance with claim 4, wherein said inorganic material functioning as said surface modifier comprises powder of calcium silicate.

6. A vacuum thermal insulating material in accordance with claim 5, wherein a molar ratio of $SiO_2/CaO$ in said powder of calcium silicate is not less than 2 but not greater than 3.

7. A vacuum thermal insulating material in accordance with claim 5, wherein said powder of calcium silicate is treated to be hydrophobic.

8. A vacuum thermal insulating material in accordance with claim 4, wherein said powder of organic material is treated to be hydrophobic.

9. A vacuum thermal insulating material in accordance with claim 4, wherein said powder of organic material is mixed with a fibrous material.

10. A vacuum thermal insulating material in accordance with claim 1, said vacuum thermal insulating material comprising a powder containing at least a salt of fatty acid as a surface modifier for said powder of organic material.

11. A vacuum thermal insulating material in accordance with claim 10, wherein said salt of fatty acid functioning as said surface modifier at least comprises calcium stearate powder.

12. A vacuum thermal insulating material in accordance with claim 10, wherein said surface modifier comprises silica powder or calcium silicate powder and calcium stearate powder.

13. A vacuum thermal insulating material in accordance with claim 10, wherein said powder of organic material comprises an foamed plastic powder obtained by grinding.

14. A vacuum thermal insulating material in accordance with claim 1, wherein said powder of organic material has a needle-like crystal form.

15. A vacuum thermal insulating material in accordance with claim 1, wherein said adsorbent comprises a powder of inorganic material having pores 5% to 20% greater than the molecular diameter of an adsorbed material.

16. A vacuum thermal insulating material in accordance with claim 1, wherein said core material comprises a powder having a reflectance of 0.9 or more.

17. A vacuum thermal insulating material in accordance with claim 1, wherein said powder of inorganic material comprises a wet silica powder.

18. A vacuum thermal insulating material in accordance with claim 1, wherein said core material has a gas phase volume ratio of 60% or more.

19. A vacuum thermal insulating material in accordance with claim 1, wherein said powder of organic material has a mean particle diameter substantially equal to or less than 150 $\mu$m.

20. A vacuum thermal insulating material in accordance with claim 1, wherein said powder of organic material has a bulk density substantially equal to or less than 150 $kg/m^3$.

21. A vacuum thermal insulating material in accordance with claim 1, wherein a mean pore diameter of said core material comprising said powder of organic material and said powder of inorganic material is substantially equal to or less than 100 $\mu$m.

22. A thermally insulating case comprising:

an outer casing;

an inner casing;

a thermal insulating foamed material packed in a space defined by said outer casing and said inner casing; and a vacuum thermal insulating material which is mounted on an inner wall of said outer casing or said inner casing and has a core material comprising a powder of organic material which has a specific surface area of not greater than 20 $m^2/g$, and a powder of inorganic material which has a specific surface area of greater than 50 $m^2/g$ and an adsorbent.

23. A thermally insulating case in accordance with claim 22, said thermally insulating case comprising a powder of inorganic material having a needle-like crystal form as a surface modifier for said powder of organic material.

24. A thermally insulating case in accordance with claim 22, said thermally insulating case comprising a powder containing at least a salt of fatty acid as a surface modifier for said powder of organic material.

25. A thermally insulating case in accordance with claim 22, wherein said powder of organic material has a needle-like crystal form.

26. A thermally insulating case in accordance with claim 22, wherein said core material has a gas phase volume ratio of 60% or more.

* * * * *